United States Patent [19]

Peterson

[11] 4,330,873
[45] May 18, 1982

[54] APLANATIC GEOPHYSICAL EXPLORATION SYSTEM

[75] Inventor: Raymond A. Peterson, Altadena, Calif.

[73] Assignee: United Geophysical Corporation, Pasadena, Calif.

[21] Appl. No.: 43,052

[22] Filed: May 29, 1979

Related U.S. Application Data

[63] Continuation of Ser. No. 221,282, Jan. 27, 1972, abandoned, which is a continuation of Ser. No. 58,406, Jul. 27, 1970, abandoned.

[51] Int. Cl.³ ............................................. G01V 1/28
[52] U.S. Cl. ..................................... 367/60; 367/68; 367/73; 364/421
[58] Field of Search ....................... 367/59, 60, 68, 73; 364/421

[56] References Cited

U.S. PATENT DOCUMENTS 3,353,151 11/1967 Rockwell.
3,691,529 9/1972 Pizante et al.

OTHER PUBLICATIONS

*Seismography 1970, The Writing of the Earth Waves*, R. A. Peterson, Nov. 1969, United Geophysical Company. "A Process of Seismic Reflection Interpretation", *Geophysical Prospecting*, J. G. Hagedoorn, vol. II, No. 2, Jun. 54.

Primary Examiner—Howard A. Birmiel
Attorney, Agent, or Firm—Reed C. Lawlor; Robert C. Smith

[57] ABSTRACT

This invention utilizes data collected in the course of reflection seismic prospecting methods to produce a map, such as a vertical profile or a three-dimensional picture, of subterranean earth formations. This is accomplished by aplanatic mapping of received seismic wave trains in the memory unit of a computer taking into account the travel times of waves, the location of the source, the location of the receiver, and the velocity with which the waves travel from the source point to the deflecting point in the earth and from then to the receiver. The data recorded by each source receiver doublet is digitalized and stored aplanatically in the memory unit, taking into account both signs and amplitudes of the signals. The accumulated data represents a map of the earth formations. Sections of this map are plotted to provide desired views of the formations.

15 Claims, 18 Drawing Figures

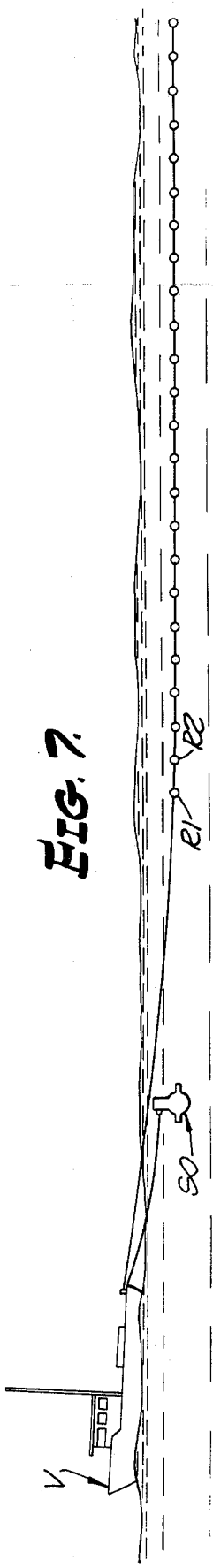
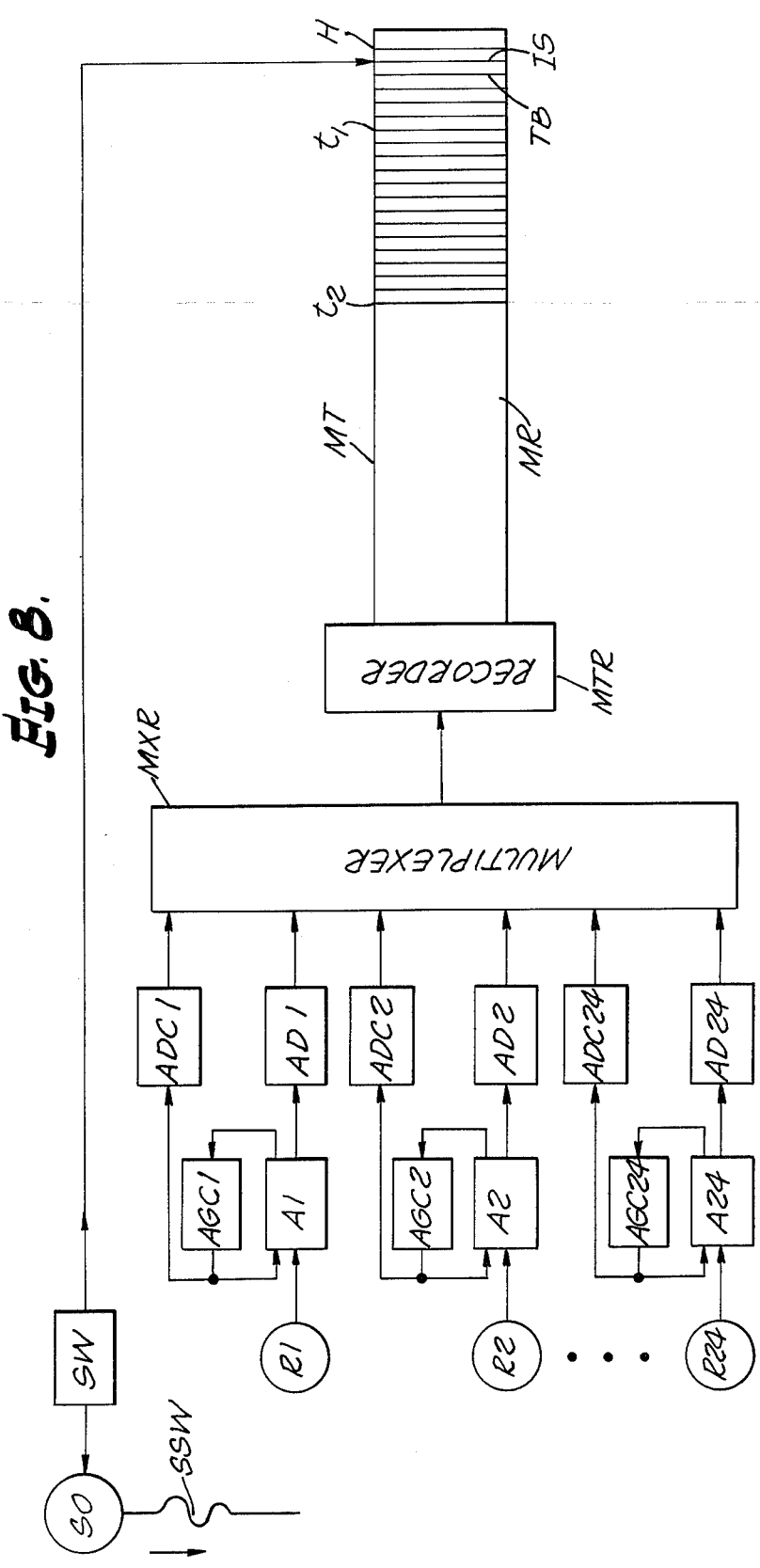

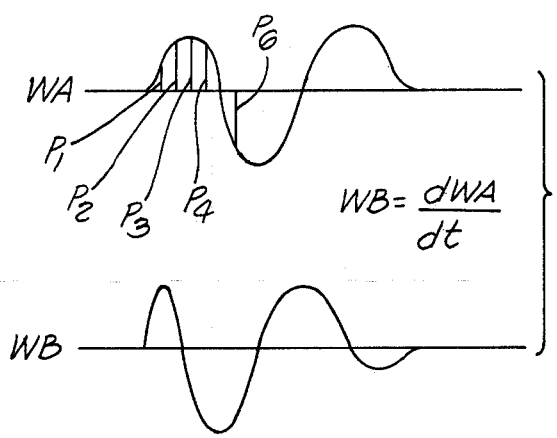
FIG. 17.
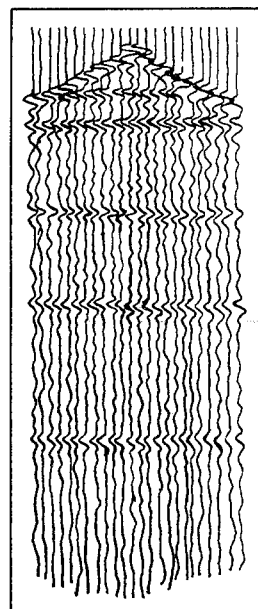
FIG. 9.
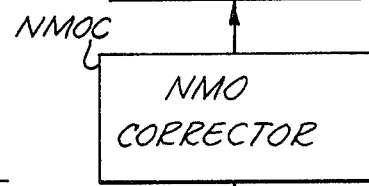
FIG. 10.
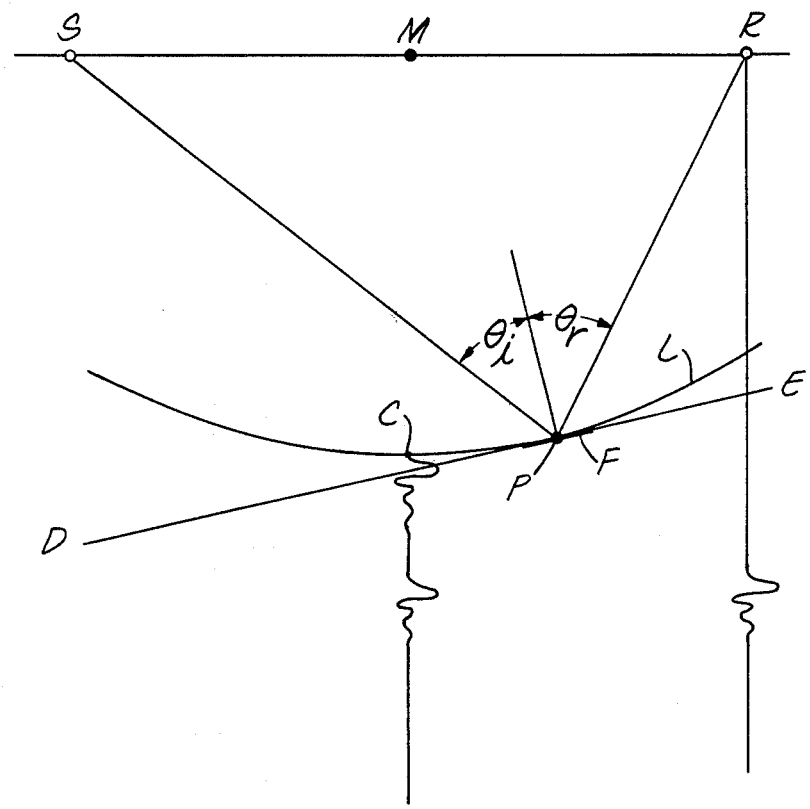
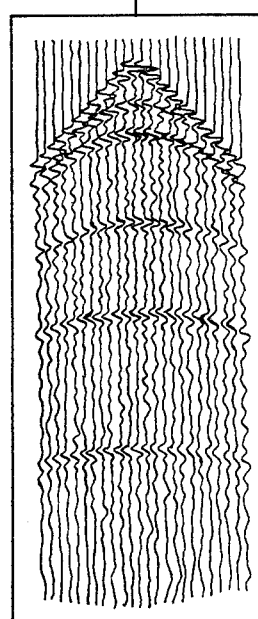

APLANATIC GEOPHYSICAL EXPLORATION SYSTEM

This application is a continuation of Ser. No. 221,282, filed Jan. 27, 1972, which is a continuation of Ser. No. 058,406, filed July 27, 1970, both now abandoned.

This invention relates to improvements in methods and apparatus for seismic prospecting, and more particularly to improvements in systems for processing digitally reproducible records of seismic waves by means of a special purpose computer, such as a programmed general purpose computer. This invention makes it possible to store an image of the subsurface structure of the earth in the memory unit of a computer and to reproduce different views of the earth as represented by this image.

In reflection seismic prospecting as it is currently practiced, seismic waves are generated at or near the surface of the earth either by detonating a charge of dynamite in a bore hole or by vibrating the earth with a shaker driven by an electric or a gasoline motor. Normally, these seismic waves are in the form of a seismic wave train, consisting of a series of alternating pulses or undulations. As these waves travel downwardly into the earth they are partially deflected from their course of travel at discontinuities in the earth. When the waves encounter transition zones between successive strata they are deflected by reflection and refraction. When they encounter junctions between materials having highly contrasting physical properties, such as junction areas at the faces of faults or salt domes or dikes, the waves are deflected by diffraction. Some of the deflected waves are returned upwardly to the surface of the earth where they are detected by seismic wave receivers, sometimes called geophones or seismometers. The received waves are usually in the form of a train of seismic waves which are received over an extended period of time, usually about 4 to 20 seconds.

In the usual practice, many seismic wave receivers are employed. Each receiver is in the form of an electromechanical transducer which converts the detected seismic wave train into a corresponding electrical wave train. The electrical wave train received at each receiver undulates in a manner that corresponds in amplitude and frequency to the shape of the received seismic wave train. In some instances, the electrical wave has an instantaneous amplitude which corresponds, over a wide frequency band, to the amplitude of the instantaneous acceleration of the received wave. In other instances, the amplitude of the electrical wave train is proportional to the instantaneous velocity of the received wave. And in other instances, the relationship between the electrical wave train and the seismic wave train is more complex. The terms instantaneous velocity and acceleration refer to the vertical motion of the earth at the location of the seismometer at the instant in question. In any event, the electrical wave train is said to correspond to the seismic wave train.

Reflection seismic exploration is usually conducted for the general purpose of locating formations in which there may be concentrations of various minerals, such as oil or sulphur or hydrocarbon gas. The specific purpose of seismic exploration is to determine subsurface structures, such as synclines, anticlines, fault zones, surfaces of salt domes, pinchouts and other departures of the subsurface from flatness and homogeneity, in order to aid a geologist to determine where such minerals are likely to be concentrated.

This invention makes it possible to simulate the subsurface structure in a memory unit of a general purpose computer. The simulation is accomplished by two major steps: first, establishing a one-to-one correspondence between various memory cells of such a memory unit on the one hand and points within small volumes of earth distributed throughout the region undergoing investigation on the other hand; and second, accumulating in the respective memory cells, digital manifestations or replicas of the received seismic waves. The digital manifestations are produced by digital reproduction of trains of seismic waves. This process may be carried out in one of two principal ways. In one way the seismic waves received at successive times separated by regular intervals is employed to generate digital signals corresponding in amplitude and sign to the instantaneous value of the seismic wave amplitude, and these digital signals are recorded. In the other way, the received seismic waves are continuously converted into a corresponding analog wave signal that is recorded as such, and the parts of the recorded analog electrical waves that occur at successive regular intervals in the recording are later converted to corresponding digital electrical signals. In either way, a train of digital signals is produced that represents the train of received seismic waves and the time of occurrence of the signal in the digital signal wave train corresponds in an appropriate manner (e.g., with or without normal moveout correction) to the travel time of the corresponding part of the seismic wave train.

The digital signals representing successive parts of each seismic wave train are stored as digital manifestations of those parts of the seismic waves in cells of the computer memory corresponding to various points in the earth from which seismic waves may have been deflected. The assignment of digital manifestations to various memory cells is accomplished by means of computer programs which take into account travel times of the waves, the geometry of the system by means of which the waves are recorded, and an assumed distribution of seismic wave velocity in the region of the earth undergoing investigation.

The process is repeated over and over throughout the area of exploration by moving the seismic wave source or the seismic wave receiver, or both. In any event, each combination of a seismic wave source and seismic wave receiver is called a seismic wave source-receiver doublet. Where a common seismic wave source is employed with say twenty-four seismic wave receivers at different points, recordings are made simultaneously for twenty-four seismic wave doublets. When the source is moved to a new point, the process is repeated for an additional twenty-four seismic wave doublets. The creation and storing of digital manifestations and their algebraic accumulation in the various cells of the computer constitute an aplanatic mapping of the waves. The accumulation of the digital manifestations of the waves in this manner results in the storage in the memory of the computer of a latent digital image or picture of characteristics of the part of the earth that produced the seismic wave records.

The invention also provides for methods for displaying, in visual form, or in other form which can be converted to a visual form, how this image is distributed throughout the computer memory unit, so as to provide a visual image of how the the characteristic is distributed throughout a corresponding portion of the earth. The image of the characteristic may be stored either in a memory unit which represents a predetermined plane section of the earth, such as a section representing a vertical profile, or in a three-dimensional representation of the earth, according to the nature of the seismic wave data available and the purposes of the exploration.

In some cases, the length of the seismic wave doublet is changed from one recording to another, while maintaining the center of the doublet constant. In this case, as is well known, reflected waves in successive recordings are received from points of a substratum which are nearly the same, though the time required for the received waves to travel from the source to the receiver in the respective recording operation depends upon the length of the doublet. When employing such methods of seismic prospecting, the recorded waves are often preprocessed so as to combine reflected waves that have been received from the same or nearly the same part of the reflecting bed. This process is sometimes referred to as common reflection point (CRP) processing. Such processes are useful because the desired signals usually reinforce each other; and because, on the other hand, the random signals, or noise, are not usually reinforced, and hence tend to cancel each other out. The net effect of these preferential reinforcing effects is that the signal-to-noise ratio is enhanced in the combined record compared with the recording for a single doublet. In other methods of seismic prospecting, waves that have been reflected from neighboring points of a reflection bed are combined in order to produce a combined wave which is representative of a reflection that might have occurred from an intervening reflection point. Such processes, which may be called interpolation reflection prospecting (IRP), also enhance signals relative to noise. Thus, common reflection point prospecting (CRP) and interpolation reflection prospecting (IRP) emphasize or enhance reflected waves compared with other waves. This invention is applicable both to enhanced and unenhanced records of trains of seismic waves.

A portion of the subsurface from which such a wave supposedly has been reflected is called a reflector. And a portion of the subsurface from which waves are supposedly diffracted is called a diffractor. A reflector is a reflecting deflector. A diffractor is a diffracting deflector. In the sense of Huyghens theory a reflector is a regular and continuous series of diffractors. Unless otherwise indicated the diffractor refers to an isolated diffractor or one at the end of a reflector or at some other horizontal discontinuity or irregularity in the reflection characteristics of the subsurface formations.

There are two types of waves which are recorded which cause considerable difficulty in interpretation of seismic recordings to determine the subsurface structure. One involves diffracted waves, and the other involves multiple reflections. In this invention multiple reflections are reduced in amplitude compared with the single reflected waves and diffracted waves are assigned to the proper locations, thereby making it easier to interpret the resultant visual representation of the substructure and to identify and locate various features of the substructure.

Waves of similar character that appear on a series of records are said to be correlated. Such correlated waves often represent reflections. However, they may represent diffracted waves or other deflected waves. When a set of such correlated waves are detected, information can be obtained as to the general location, dip, and strike of the reflecting horizon if indeed one was responsible for the production of the correlated waves. But where there is an unconformity of any type involving intersections between beds dipping in different directions or in different amounts, many other waves arrive simultaneously with the reflected waves, thus causing the record to be confused.

When a wave is noted on a record of a single wave train corresponding to a single source-receiver doublet, there is no way to know whether the wave represents a reflection or, even if it does, what the direction is to the reflecting bed. However, in the normal course of events, the record includes information sufficient to enable the user of the record to know the total time required for the wave to travel from the source of the doublet to the deflecting point and thence to the receiver of the doublet. For any particular direction in space from the doublet, the distance to the deflector, if there is one in that direction, can be calculated. This distance is determined from the total travel time of the particular wave in question from the source to the receiver, and the manner in which the seismic wave velocity varies in the earth through which the wave travels. By way of example, if the velocity of the earth is constant, and the source and receiver are at the same point, all of the possible deflectors lie on the surface of a hemisphere. If the source and receiver are not at the same point, all of the potential deflectors lie on the surface of an ellipsoid, having an axis along the line of the doublet. A hemisphere, of course, is a special type of ellipsoid. If the velocity varies as a continuous function of depth, for example, as a linear function of depth, all of the potential deflectors lie on the surface of an isochronic or aplanatic surface, that is, a quasi-ellipsoidal surface. When the velocity varies as a step function of depth, as is quite often the case, the surface is an isochronic or aplanatic surface consisting of a series of connected quasi-ellipsoidal surfaces. The terms isochronic and aplanatic are also applied to spherical and other ellipsoidal surfaces.

As previously mentioned, according to the present invention, a one-to-one correspondence is established between the cells in the memory unit of a computer on the one hand and points in the volume of the earth beneath the area being explored, on the other hand. According to this invention, a digital manifestation representing a characteristic of a wave received at any particular time by any particular doublet is additively stored in all of the cells of the computer memory that correspond to each of the respective points in the earth beneath the doublet from which the wave may have been deflected to the receiver. This manifestation may be in the form of a binary number which has a magnitude and a sign (+ or −) representing some characteristic of the wave in question. More particularly the binary number may be proportional to the amplitude and have the sign of the part of the wave that corresponds to the travel time in question. This manifestation is made small enough relative to the storage capacity of the memory cell that manifestations of other waves generated and received in other doublets may also be stored in the same cell in an additive manner. In the best embodiment of the invention, the manifestations are both positive and negative, depending upon whether the amplitude of the wave being recorded is positive or negative, and the various manifestations (both positive and negative manifestations) are added algebraically in the various memory cells. By algebraic addition or accumulation is meant adding with due regard to the signs of the numbers or phenomena in question. This algebraic summation process is sometimes referred to hereinafter as integration. Indeed, the effect of such summation in each of a series of neighboring memory cells is capable of producing a visual effect that simulates that of visual integration, especially when the number of manifestations being accumulated in each memory cell is large, say ten or more.

In the practice of this invention many approximations are often made which lead to useful and accurate information about the general shapes and locations of subsurface structures, even though some precision in information as to the strike, dip, and location of some particular parts of subsurface strata within the earth is thereby precluded. In this connection, it will be understood that it is important to know the general location of a fault or the general location of the sidewall or of a cap edge of a salt dome and the location of the apex of an anticline, even though one does not know exactly which subsurface stratum or horizon lies at a particular depth in the neighborhood of such a location. Thus, for example, while it might be desirable from a theoretical standpoint to store digital manifestations corresponding to respective successive points of a wave in the memory cells that correspond to points in the earth, valuable information regarding subsurface structures can often be developed by storing data in memory cells that correspond to a particular part of a wave, such as its inception point or such as its first peak amplitude, and then to store data corresponding to successive parts of that same wave in a series of memory cells that represent points on a vertical line in the earth. Thus, in practice, in the interests of economy and utility, wave train segments, each consisting of a series of half-waves are often stored over a series of memory cells that correspond to points that lie on a vertical line in the earth. Highly accurate results are obtained by storing manifestations of the characteristics of waves which occur about 0.002 sec apart on the seismic-wave recording in the cells that correspond to reflection points corresponding to the respective travel times. Examples of both types of storage are described hereinafter.

It is to be noted that in the integration process described, account is taken of the variations of velocity in the earth, as well as the travel times of the various wave-train segments. This assures maximum reliability in adding together manifestations of wave-train segments which have been received from the same point in the earth over different paths, and also assures maximum reliability in storing the wave segments in the parts of the computer memory unit which correspond closely to the respective reflection points in the earth. When employing this invention, waves which have been reflected from adjacent points beneath the surface of the earth produced in various recordings are stored, side by side in cells within the computer memory that correspond to those reflecting points. Similarly, if waves have been received after diffraction from some irregularity beneath the surface, the maximum accumulation of manifestations occur at a location in the memory unit of the computer corresponding to the location of the diffraction point within the earth. In this way, the distribution of accumulated manifestations among the various cells of the computer memory represents an image of the earth itself in the area undergoing exploration.

It will be understood that the amplitude of the seismic wave recorded on a seismic wave record at any instant during recording does not usually correspond to the local value of a physical characteristic of the earth at a single point. Rather, the amplitude of the wave recorded at any instant represents an integrated effect due to changes in earth characteristics at many points throughout a volume of the earth surrounding that single point and having a dimension comparable to about one-half wave length. The existence of such an integration effect is clear from the fact that a part of the signal that leaves the source later than another by a time difference $\Delta t$ will arrive at the receiver simultaneously if it has been partially reflected from a part of the subsurface which lies a distance $\frac{1}{2}$ v$\Delta t$ above that from which the earlier part of the signal is partially reflected (here v is the velocity in the region of the reflecting parts of the subsurface). Furthermore, the reflection coefficient at any point in the earth depends upon the gradient of the "acoustic impedance" at that point. Thus, while the image of the earth produced in accordance with this invention does not represent a local characteristic of the earth point by point, it does represent an integrated effect of changes in such a characteristic of the earth over a region or volume of the earth in the neighborhood of each point. For this reason, even though the image of the earth is not a true image of a local characteristic that varies from point to point, the image does, in any event, disclose the general shape and location of structures of the earth.

In order to achieve these results, the various source-receiver doublets are located at the surface of the earth at positions which are close to neighboring doublets compared with the wave length of the waves being recorded. Since these waves generally have wave lengths along the direction of travel less than about five hundred feet, in order to explore a volume of earth beneath the surface, the doublets are located with their centers less than about two hundred feet apart horizontally over the area of the earth in question. However, effective results may also be achieved when the centers of successive doublets are located more than a wave length apart if the underlying structures have low dip.

In some cases it is only necessary to determine the structure of the earth in a vertical plane along a line of exploration. This is particularly true where the line of exploration is nearly perpendicular to the strike of the strata, or where the dips of the beds are low. Criteria for making such determinations are well known in the art, and will not be described in detail here.

In practicing the invention, advantage is taken of the fact that extreme precision is not required. For convenience and simplicity in making computations and for other purposes, manifestations of waves are often not stored over a complete aplanatic surface, but only over a portion thereof, which lies in the general direction corresponding to that in which a reflecting bed may lie. In any such direction, the shape of the aplanatic surface may be approximated by a sphere or a paraboloid or some other curved surface, by methods which are well known in the art. Thus, for example, it is well known that any particular portion of an ellipse may be approximated by the arc of a circle. The methods by which such approximation and similar approximations are made will therefore not be described.

The invention will be described with reference to its use in a general purpose digital computer. Details of computer programs that may be used for performing the required operations will not be set forth. However, sufficient explanation of the manner in which the invention is practiced will be described to enable a person skilled in mathematics and in the programming art and in seismic prospecting to prepare the required programs and to perform the needed operations. It is to be understood, therefore, that the invention is not limited to the details of a particular computer program, but lies in a concept which may be utilized for writing many different programs for use in general purpose computers or to design preprogrammed special purpose computers to enable the invention to be carried out.

DRAWINGS

The invention may be understood with reference to the following description taken in connection with the accompanying drawings wherein:

FIGS. 1, 1A, 2, 3, and 4 represent plan views of layouts employed in field operations in the production of records to which the invention may be applied;

FIG. 7 is a diagram employed to explain field operations of the off-shore exploration type, to which the invention may be applied;

FIG. 8 is a block diagram showing how a record is normally produced in the course of field operations of the type referred to in connection with FIG. 7;

FIG. 9 is a block diagram illustrating how normal move-out corrections are normally applied;

FIG. 10 is a geometrical drawing employed to explain certain phases of the operations occurring in the practice of the invention;

Figure 14:
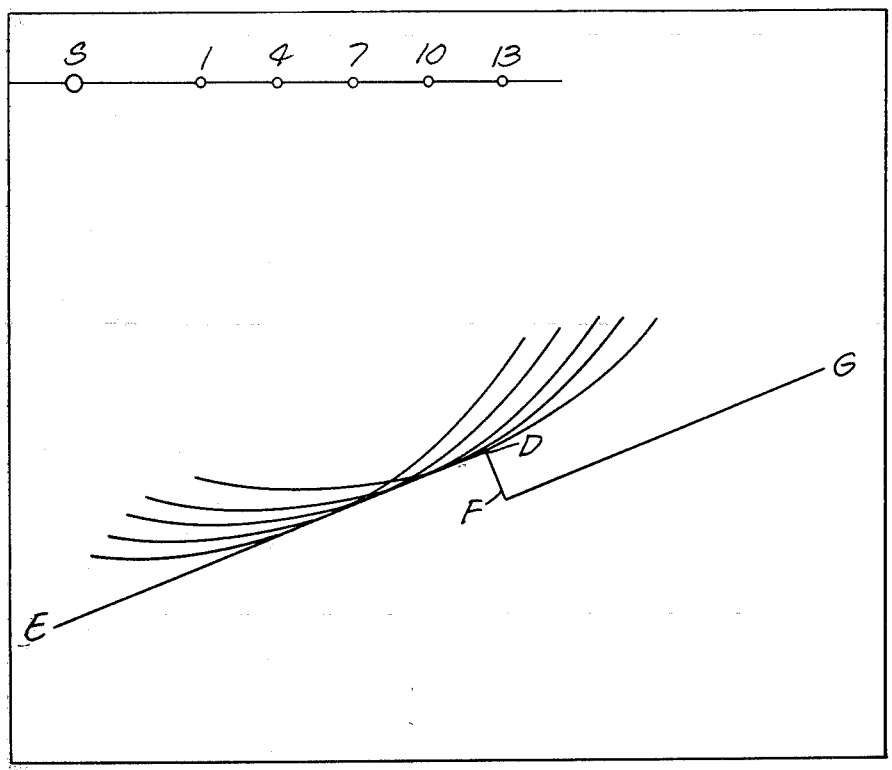
Figure 15:
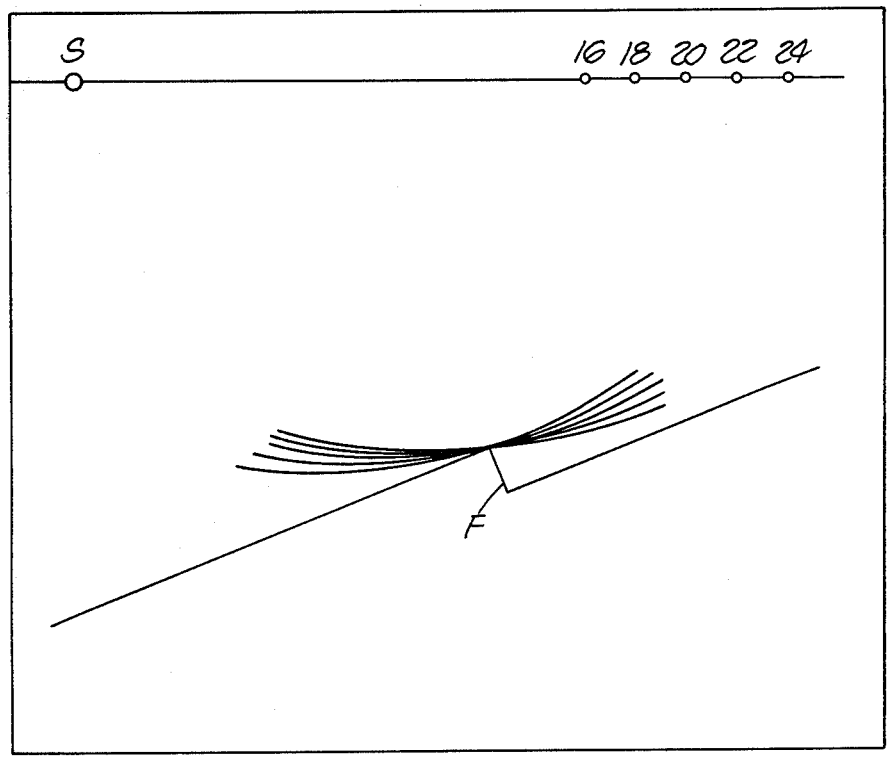
Figure 16:
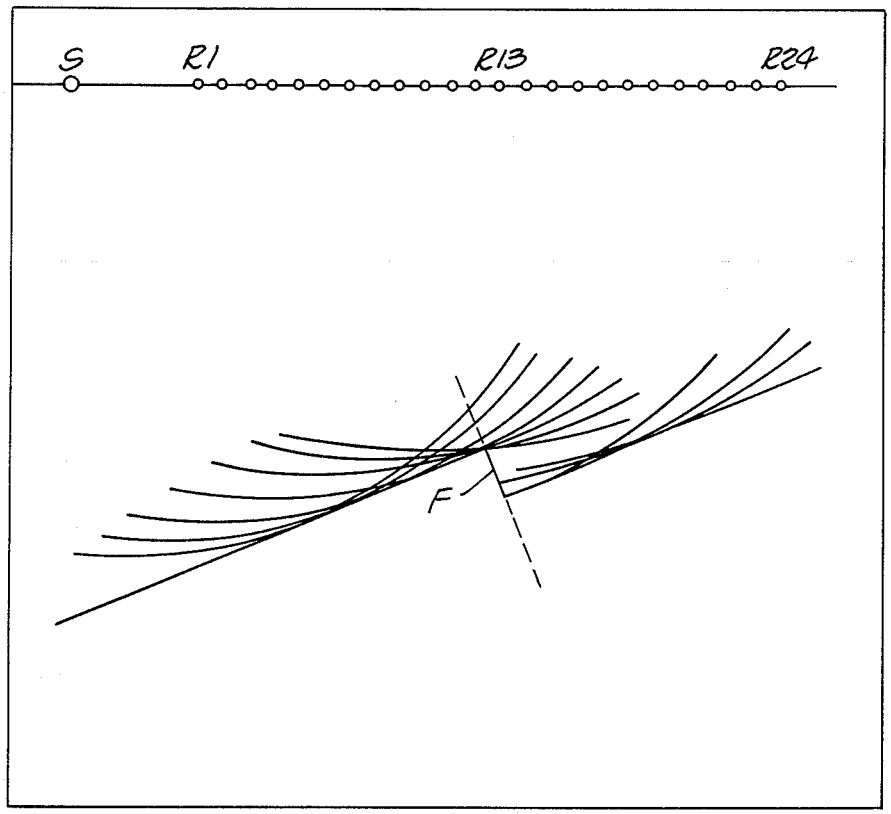
Figure 18:
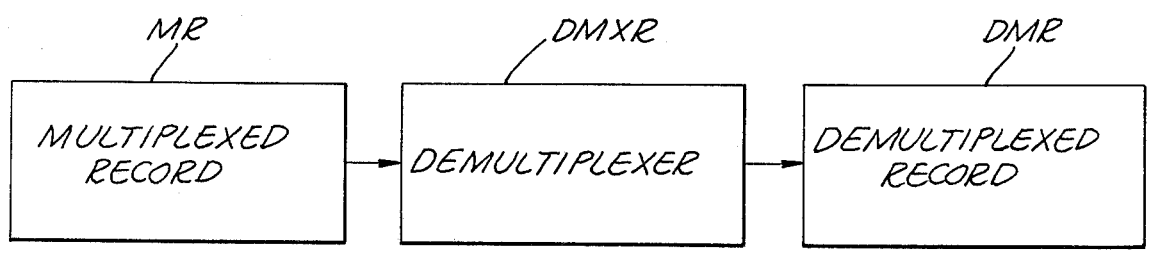

FIGS. 14, 15, and 16 are diagrams employed to explain certain effects obtained by aplanatic mapping in accordance with this invention;

FIG. 17 consists of two graphs employed to explain certain operations employed in one form of the invention; and FIG. 18 is a schematic diagram of a dimultiplexing system.

The invention will be described with reference to an embodiment of the invention which is practiced in part in the field and partly in a data processing and interpretation center.

FIELD OPERATIONS

To facilitate understanding the invention, it is desirable first to describe, in a general way, some of the details of typical field operations.

Figure 1:
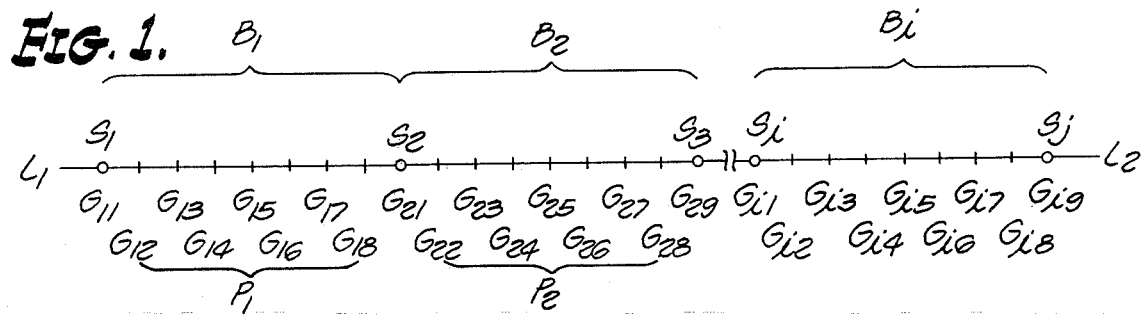
Figure 1A:
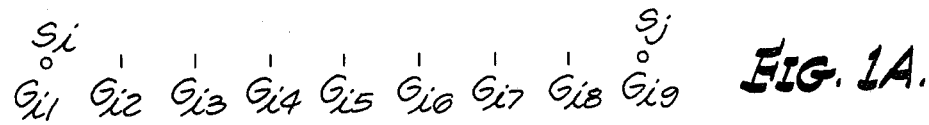

In one common method of seismic exploration to which the invention is applicable, a series of shot points or seismic wave generator stations $S_1$, $S_2$, $S_3$ are located along a straight line in an area under investigation, and spreads $B_1$, $B_2$, $B_3$ of seismic wave receivers are positioned between them, as illustrated in FIGS. 1 and 1A. Spread $B_i$ extends from seismic wave generator station $S_i$ to seismic wave generator station $S_j$ where $j=i+1$. Thus, the spread $B_1$ extends from seismic wave generator station $S_1$ to $S_2$ and spread $B_2$ extends from seismic wave generator station $S_2$ to $S_3$. Each spread $B_i$ of receivers consists of a string of regularly spaced geophones located at regularly spaced receiver stations $G_{ik}$ where k identifies the geophone in spread $B_i$. Thus, for example, where nine (9) geophone stations are located at regularly spaced points one-eighth of a spread-length apart between successive seismic wave generator stations $S_i$ and $S_j$, the geophones and the geophone stations at which they are located are identified by the symbols $G_{i1}$, $G_{i2}$, ... $G_{i9}$. It will be noted that $G_{j1}=G_{i9}$. This equality represents the fact that the adjacent end geophones $G_{i9}$ and $G_{j1}$ of contiguous spreads $B_i$ and $B_j$ are located at the same seismic wave generator station at the contiguous ends of the spreads. By way of example, in FIG. 1, spread $B_{12}$ consists of geophones located at geophone stations $G_{11}$, $G_{12}$, ... $G_{19}$ and the geophones of spread $B_{23}$ are located at geophone stations $G_{21}$, $G_{22}$, $G_{23}$ ... $G_{29}$, and the geophone stations $G_{19}$ and $G_{21}$ are identical.

In FIG. 1 every combination of seismic wave generator S with a geophone G is called a source-receiver, or SR, doublet. The process that involves generating seismic waves at a source and receiving the seismic waves at a receiver of a doublet and which involves many doublets is known broadly as "exercising the doublet". The doublet may be exercised in many ways. Commonly the doublet is exercised by translating either the source or the receiver while holding the other end of the doublet fixed, or by translating both the source and the receiver simultaneously while holding the midpoint fixed.

Exploration then along the exploration line $L_1$-$L_2$ involves exercising the source-receiver doublet along the line $L_1$-$L_2$, that is, generating seismic waves at station $S_1$, receiving the seismic waves at receiving points $G_{11}$ ... $G_{19}$, then generating seismic waves at the source point $S_2$ and receiving seismic waves at the same receiving points $G_{11}$, ... $G_{19}$ and repeating the process over and over along the line $L_1$-$L_2$. This particular process is known as continuous profiling.

In another way of exercising a source-receiver doublet along the exploration line $L_1$-$L_2$ of FIG. 1, seismic waves generated at a seismic wave generator station and deflected by underlying formations are received at seismometers located in a symmetrical, or split, spread. In such an arrangement, seismic wave receivers are located on opposite sides of the seismic wave generator stations. And the process is repeated over and over along the length of the exploration line, in such a way as to establish continuity of exploration of underlying reflecting strata. By way of example, such a method would involve generating seismic waves at the station $S_2$ in FIG. 1 and receiving deflected waves at the two spreads $B_1$ and $B_2$ and then generating seismic waves at stations $S_3$ and receiving deflected waves at spreads $B_2$ and $B_3$, then generating seismic waves at the station $S_4$ and receiving deflected waves at spreads $B_2$ and $B_3$ and so on. In this system of recording each pair of spreads $B_1$-$B_2$ and $B_2$-$B_3$ at which waves are received after being generated at their respective midpoints $S_2$ and $S_3$, constitutes a split spread. This particular process is also known as continuous profiling.

In the generation of seismic waves, when a doublet is exercised only along a single line such as that illustrated in FIG. 1, it is customary to locate the line in a direction which extends along a line more or less perpendicular to the strike of the underlying strata, that is, along a line generally in the direction of the maximum dip of the strata. When this is done, the structure of the beds, as it appears in a vertical plane passing through the exploration line $L_1$-$L_2$, can be farily well determined.

The distance between the source and receiver of a doublet is known as its length and the direction between as its axis. In most instances, the axis of a doublet lies along a line of exploration.

In the usual practice of seismic prospecting, the records corresponding to various doublets are compared, and calculations are made on the basis of such comparisons to indicate what dip the various reflectors would have in order to produce such records, if the reflectors are perpendicular to the vertical plane. Representations of such reflectors are then plotted or otherwise impressed on a sheet of paper or other display medium. The display so produced is called a vertical profile. Errors may exist in such displays because, in fact, the line of exploration is not perpendicular to the strike and because some of the supposed "reflectors" plotted on the profile are not really reflectors at all.

Figure 2:
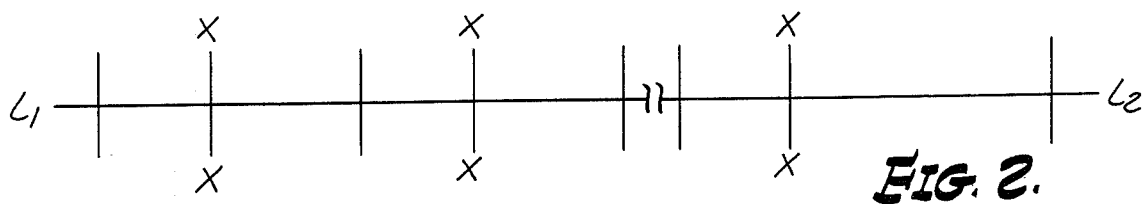

Seismic exploration conducted in this way yields no information as to how far off from the vertical plane the reflector may lie. Additional information is often obtained by recording seismic waves at geophones stationed on cross lines X—X as indicated in FIG. 2. Information obtained from such records is often employed to determine how far off the exploration line $L_1$-$L_2$ the reflector may be and then the reflector is projected into the vertical plane extending through the line $L_1$-$L_2$ of exploration in order to determine the profile more accurately. In a more advanced method of seismic prospecting, exploration is conducted along many parallel exploration lines $L_1$-$L_2$, $L_3$-$L_4$, $L_5$-$L_6$, as in FIG. 3. In the past, the three lines of exploration were quite a distance apart, such as half a mile. Though recordings for such lines may be employed, in this invention better results are obtained if the spacing between successive lines is about the same as the distance between successive geophones, that is, about 200 to 300 feet apart.

In still another method of practicing seismic prospecting, many generating stations are located in an array, such as a rectangular array at the surface of the earth above or near the geological structure under investigation. In this method, such source-receiver doublets are exercised in various directions over the area in question.

Figure 5:
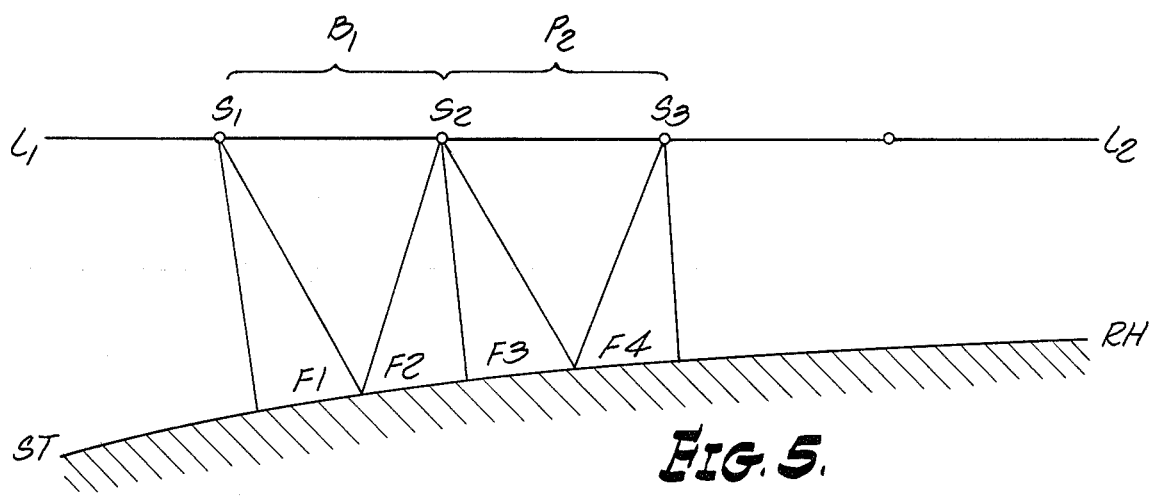
FIG. 5 is a schematic diagram employed to explain some of the actions occurring in certain field operations to which the invention may be applied.

The manner in which substantially complete coverage of a subterranean stratum is achieved with systems such as that illustrated in FIG. 1 and which is sometimes called continuous profiling, is illustrated in FIG. 5. This figure represents a vertical section through the earth along the exploration line $L_1$-$L_2$ of FIG. 1. Here it will be noted that received waves include waves which have been reflected from successive sections $F_{12}$, $F_{23}$, etc. of a reflecting horizon RH at the upper surface of a stratum ST, all as is well known to those skilled in the art.

Figure 4:
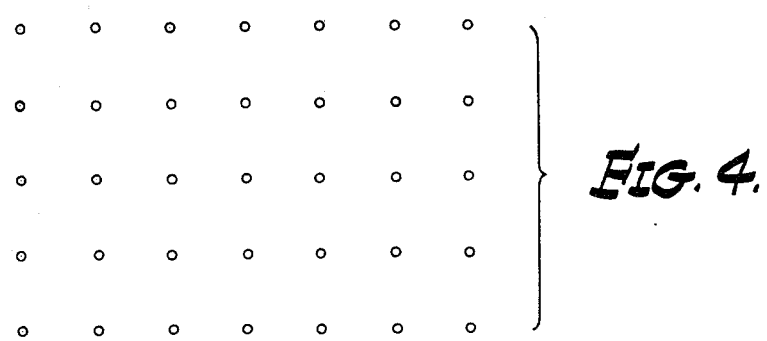

In the system illustrated in FIG. 4 for exploring an area, there are two sets of exploration lines arranged at right angles. Each of the lines in the array, in effect, is similar to the exploration line $L_1$-$L_2$ of FIG. 1. Seismic wave sources are arranged at the intersections of the various exploration lines and seismic wave receiving points are arranged on each exploration line between successive sources. The SR doublets are exercised as before along the respective exploration lines. By exercising a source-receiver doublet over an area in this manner, very comprehensive three-dimensional reliability can be attained. Seismic wave records obtained by recording waves received at the different receivers of spreads lying on opposite sides of a seismic wave generating station, such as station $S_2$, may involve the reception of waves from reflectors on the portion $F_2$ and $F_3$ of the reflecting horizon RH that extend in different directions from the generating station below the surface of the earth. For best results, these lines of exploration should be about one wavelength apart, wavelength here meaning wavelength of waves at the depth of the structures under investigation. By "about the wavelength" is meant approximately one-half to twice the wavelength.

Figure 6:
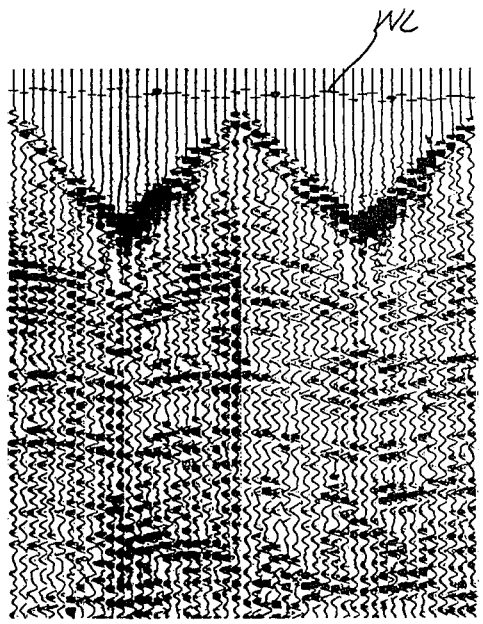
FIG. 6 illustrates an ensemble of records obtained in certain field operations.

A typical recording may be in the form of a variable density phonographic record or a magnetic record. In both instances, the amplitude of the received seismic wave varies along the length of the record. In such a record the density of the image on the film of any trace, or the amplitude of modulation of a frequency modulated wave recorded on magnetic tape or some other physical characteristic of the record, varies along the length of the record in a manner that corresponds to the variations in amplitude of the recorded seismic wave. This amplitude of the received wave may be the amplitude of the alternating or variable velocity of particles at the surface of the earth or the amplitude of some other physical characteristic, such as fluid pressure, associated with the received wave. In any event, the seismic wave train received at each of the receivers at the surface of the earth is recorded in a corresponding manner on the record medium. FIG. 6 is an ensemble of such records, obtained with three shot points, e.g., $S_1$, $S_2$, and $S_3$ and two intervening spreads laid out on a common line of exploration as in FIG. 5, arranged side-by-side on a common display medium to display waves received from underlying strata along a line of exploration. In this case, the recording is in the form of a combination of galvanometer traces and variable area traces. The marks WL at the top represent weathering corrections and elevation corrections that have been introduced in accordance with methods that are well known.

In still another type of recording, a record is made of the amplitude of the received wave as a succession of signed binary-digital signals which indicate both the magnitude and direction (+ or −) of the velocity or pressure or other characteristic of the received wave. These signed binary signals are distributed along the length of the record in a manner corresponding to that with which the amplitude of the received seismic wave varies as a function of time while the seismic wave train is being received. Typically, in such a record a + sign corresponds to upward movement of the earth particles or increase in fluid pressure, and a − sign corresponds to downward movement or decrease in fluid pressure at the seismic wave receiving station.

In many forms of recording seismic waves, a separate track is employed to record elapsed time. This track bears a marker which represents a "time break" which is produced by well known methods at the time that outward transmission of seismic waves is initiated from the seismic wave generator. By recording such a time break during the course of making the record of the seismic wave trains, it then becomes an easy matter to measure the total travel time elapsed between the instant of initiation of the seismic waves and the time of reception of a wave on any particular record.

As seismic waves are received at later and later times during recording, the amplitude of the received waves grows smaller and smaller on the average. In order to record the waves as signals having an amplitude within a range which permits the recorded seismic wave signals to be operated upon efficiently with reproducing equipment at a later time, various gain control systems are employed for changing the amplification of the recorders during the recording. Three main types of gain control are employed for this purpose; one is known as time-gain control; another is known as automatic gain control; a third is known as binary gain-ranging. In a method of automatic gain control now commonly employed and called binary gain-ranging, the gain is changed by a factor of 2 automatically whenever such a change is needed to maintain the average signal amplitude near the center of a predetermined amplitude range.

In any event, in the best method of practicing seismic prospecting, the gain of the recording system is varied as a function of time, and a record is made along a length of the record which represents how the gain itself varies as a function of time during the recording. Later, the gain is varied in an inverse manner, when desired, to reproduce the various waves with their correct relative amplitudes over any particular range of time on the record. At the same time, the gain is varied over any particular section of the record in any way desired to bring the amplitude of the reproduced electrical waves within a desired range suitable for handling with the equipment being used.

The present invention is particularly effective when the field operations are performed in such a way that the region of the subsurface from which reflections are recorded in any particular spread are not merely continuous as in the continuous profiling methods described above but overlap as in offshore exploration as commonly conducted. One advantage of such overlapping lies in the fact that the number of doublets, on the average, over a 1,000 ft. of geophone spread is very high, being about 20 to 40 or more. As a result, the average spacing between reflection points on a flat subsurface is about 50 feet to 25 feet or less. The advantage of such average close spacing in the practice of this invention will be made apparent hereinafter. In such an offshore exploration system, for example, as illustrated in FIG. 7, a seismic wave source SO is towed behind a moving vessel V together with a string of seismic wave receivers in the form of hydrophones $R_1 \ldots R_{24}$. In such a case, seismic waves in the form of pressure waves are generated intermittently, each time the vessel advances along the line of exploration by a distance corresponding to the distance between alternate seismic wave receivers.

In such a system, the recording is accomplished by multiplexing analog-to-digital representations of the pressure waves received at the respective hydrophones. For example, in FIG. 8 there is illustrated a series of analog-signal amplifiers $A_1 \ldots A_{24}$ which amplify signals received by the respective hydrophones $R_1 \ldots R_{24}$. Each of these amplifiers has associated therewith an automatic gain control unit AGC1 ... AGC24 or other time gain control system. An analog-to-digital converter AD1 ... AD24 ... is connected in the output of each gain control unit to convert the analog signal appearing in that output into a corresponding binary digital signal consisting of a series of 1 and 0 pulses or other signals. Auxiliary analog-to-digital converters ADC1 .. . ADC24 are connected to the respective automatic gain control units AGC1 ... AGC24 to produce digital signals representative of the values of the amplification, or gain, factors involved in the transmission of signals from the input to the output of the respective amplifiers $A_1 \ldots A_{24}$. All of these signals are fed simultaneously into a multiplexer MXR which includes a commutating section for feeding the digital signals corresponding to the respective hydrophones $R_1 \ldots R_{24}$ to the output one at a time where they enter a magnetic tape recorder which thereupon records the signals sequentially on a magnetic tape MT.

The head section of the tape has previously been marked with an identifying symbol, such as an index number, by means of which the tape and the records thereon may be subsequently identified. At the same time, a time break TB is applied to the record to indicate the time of initiation of a seismic wave signal SSW from the seismic wave generator SO. The operation of the seismic wave generator SO, the indexing of the tape with an identifying index signal and the recording of the time break TB are initiated by means of a control switch SW. Zero or other signals are then recorded on the tape MT at intervals of 0.002 second until the first signal to be received is detected by the receivers. This first signal usually represents a pressure wave that has traveled horizontally from the source SO to the nearest receiver $R_1$. The signals supplied to the multiplexer are automatically commutated at a repetition period of 0.002 sec so that they may be fed one at a time to the magnetic tape recorder. In other words, at intervals separated by 0.002 sec a complete record is made of the signals appearing in the outputs of the analog-to-digital converters AD and ADC2 that supply the multiplexer. For example, commencing at time t1 twenty-four pairs of records are made. One record of the first pair is in the form of a binary signal appearing at the output of one of the analog-to-digital converters ADC1 and the other member of that pair is a digital signal appearing at the output of the corresponding analog-to-digital converter ADC. These two signals correspond to the signal being received at the corresponding hydrophone $R_1$. The next pair of recorded signals corresponds to the output of the second hydrophone $R_2$ and so on until two signals corresponding to the output of the last hydrophone $R_{24}$ are recorded. After a short interval of time the process is repeated over and over at 0.002 sec intervals for a predetermined extended period of time such as 4 secs to 20 secs. Then after a short wait, depending on the speed of travel of the vessel V, the process is repeated. Desirably the seismic wave source SO is actuated or "fired" to generate a new seismic wave and to produce a new recording at intervals that are about the wavelength of the waves that are to be aplanatically mapped. If deep formations are to be mapped, the firing interval may be about 600 ft. but if shallow formations are also to be mapped a firing interval of 100 ft. is desirable. As a result, a series of records corresponding to the successive initiation of seismic waves from the seismic wave pressure source SO are recorded in succession on a long magnetic tape.

For optimum results, such overlapping recording process is practiced by recording over grids of exploration lines is illustrated in FIG. 4.

PROCESSING OF DATA

In the present invention, a new and versatile process is employed which makes possible a more realistic visual display of subsurface formations. In this invention, the waves received by the various doublets are integrated to display reflectors in more nearly correct relationship with each other and with the representation of the surface. At the same time, waves which have had their origin in diffraction from a common irregularity beneath the surface of the earth are clustered together in the display at a point corresponding to the location of that irregularity in the earth. This invention enables the interpreter to know more accurately the location of faults, dikes, coral reefs, walls of salt domes and the like.

This invention may be practiced in many different ways. It may be applied to many different systems for exercising source-receiver doublets including those described above in connection with FIGS. 1-8. It may also be practiced by application to original records RO or to records RN which have been modified by processing with a normal moveout corrector. Ideally the invention is practiced by means of methods involving close average spacing of doublets as illustrated in FIG. 7. A number of applications of this invention are described hereinafter. Many of these applications make use of processes and apparatus that have been used heretofore as well as new processes and apparatus.

Figure 3:
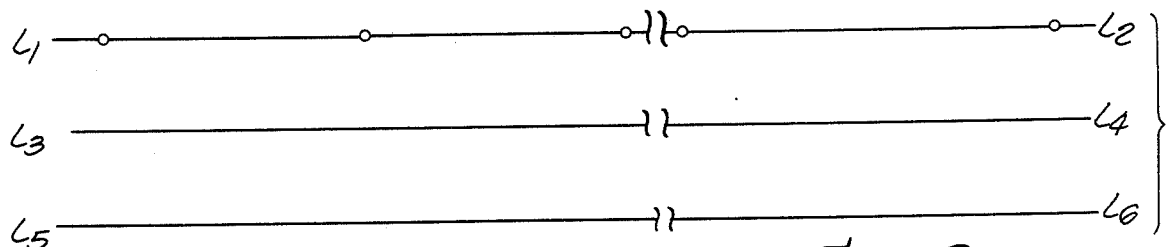

In order to explain the operation of the invention, reference is made, by way of background, to FIG. 5 illustrating a vertical section of the earth lying along the exploration lines $L_1-L_2$ of FIG. 1 or FIG. 2 or one of the exploration lines of FIGS. 3 and 4.

In using one of these systems, seismic waves are generated at station $S_1$ and they are received at stations $G_1 \ldots G_9$ after reflection from a first portion $F_1$ of stratum ST as well as after reflection from other strata. Subsequently, seismic waves are generated at station $S_2$ and received at the same receiving stations $G_1 \ldots G_9$ after reflection from a second portion $F_2$ of the stratum ST and after reflection from some portions of other strata. The received waves are converted to corresponding electrical waves which are then processed by a bank of amplifiers and other electrical equipment and are then recorded in some reproducible manner on a record such as a magnetic tape.

It is not a very difficult matter to determine the general attitude, strike and dip of the statrum shown in FIG. 5 if it is the only major reflecting stratum beneath the surface. However, considerable difficulty arises if the underlying strata involve many reflecting surfaces lying at somewhat different attitudes and if there is considerable faulting or if there is considerable irregularity of other kinds, such as irregularities in the form of dikes, salt domes, pinchouts or coral reefs.

Normal Moveout Corrections

As a first approximation of the distribution of reflectors within the earth, it has been common practice to make normal moveout (NMO) corrections. In this process each of the travel times t to every part of every record is corrected in order to represent the time of travel that would be required for a wave to travel from the source to the receiver after reflection at the same reflector if the doublet length was zero, and the received wave was indeed reflected from an underlying horizontal reflector. This is done by subtracting from the travel time a small time correction value dt which depends upon the geometry of the arrangement and also upon the value of the travel time t and the average seismic wave velocity over the path of travel of each wave, all as is well known in the art. In standard methods, the correction is made on the assumption that the reflector lies in a horizontal plane. So long as the dip of the reflector is low, the error in the resultant "vertical" time (actual travel time minus dt) is low or negligible.

As illustrated in FIG. 9, the raw data of one of the original records RO obtained in the field in which the actual travel times are correctly recorded are processed by a normal moveout corrector (NMOC) to produce a new record RN which has been corrected by subtracting the correction times dt. The general manner in which such corrections are made can be readily understood by reference to FIG. 10. The records illustrated in FIG. 9 involve reflections from nearly flat beds.

In FIG. 10 a source-receiver doublet is represented by the symbols S and R at which the source and receiver of the doublet are respectively located at the surface of the earth. Assuming that seismic waves are generated at the source S and received at the receiver R after regular reflection from a subsurface reflecting interface or zone DE which is inclined with respect to the horizontal, the seismic waves are, in effect, reflected from a reflector F at the point P. At the point of reflection, the angle $\theta_i$ of incidence is equal to the angle $\theta_r$ of reflection. If we assume that indeed the total travel time required was along a vertical path directly beneath the midpoint M of the doublet, and ignoring the inclination of the reflecting interface DE, the reflection would appear to come from a point C directly beneath the midpoint M. The total time required for the wave to travel over the path SPR is greater than it would be if the wave actually traveled vertically downwardly to the bed along the path MC.

Taking into account the finite distance between the source and receiver and the average velocity of travel and making a suitable normal moveout correcton in accordance with conventional techniques with computers programmed by well known methods, the reflection would appear to occur at a point C directly beneath midpoint M.

Figure 11:
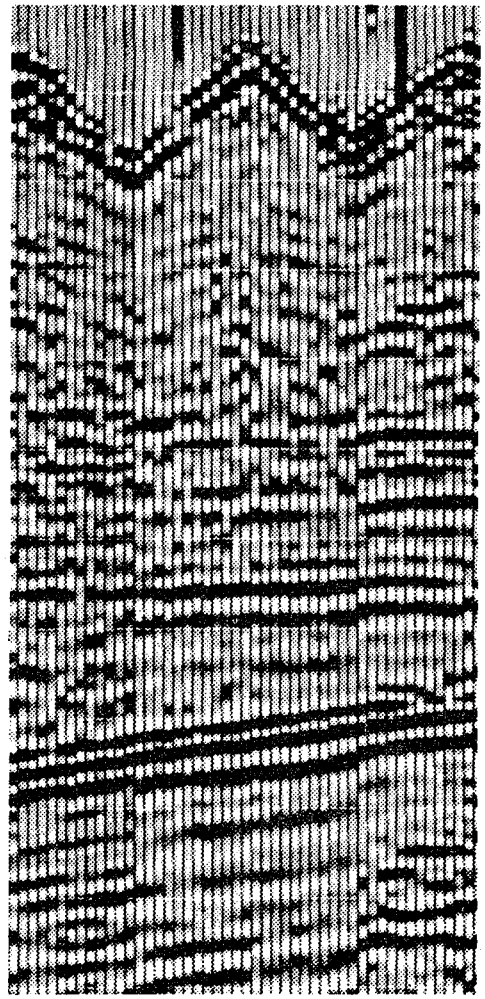
FIG. 11 shows an ensemble of records after normal move-out correction has been applied.

When a number of records for which normal moveout corrections have been made in accordance with the foregoing explanation are displayed side-by-side on a recording medium such as photographic paper, the composite display so formed is very simple. Such a display is represented in FIG. 11. But such a display involves errors since, in fact, as indicated in FIG. 10, the reflectors do not lie directly beneath the midpoints M of the respective doublets. Furthermore, the display is difficult to interpret if the subterranean structure is complex, especially if deflected waves arrive at the receiver from different directions beneath the earth and they are recorded simultaneously.

Before the normal moveout correction is made, waves corresponding to flat subterranean strata are curved on the record (see FIGS. 6 and 9), especially where the reflections are from shallow strata, giving a scalloped appearance. After normal moveout corrections have been made, the records of waves corresponding to successive portions of the reflecting bed lie substantially along a straight line as in record RN (see FIG. 9).

Even when the underlying structure is simple, account should be taken of the fact that the reflectors which produce the records displayed beneath the midpoints on the corrected record RN do not lie directly beneath the respective midpoints but are offset therefrom. The amount and direction of this offset depends in part on the strike and dip of the reflecting surface. The amount of offset required when the received wave is diffracted instead of being reflected is usually completely indeterminate with normal moveout correction systems used heretofore.

In the prior art system just described, the record RN incorporates time corrections but not offset or depth corrections. In other words, though a record of the type RN has been produced by applying NMO correction to an original record RO, the NMO correction is incomplete and for some purposes inadequate. Many records of the type represented in FIGS. 6, 7, and 9 have been produced in the past. This invention can be applied to the analysis of such records, whether they are original records as record RO or NMO-corrected records as record RN, as well as to records newly and deliberately made for use in this invention.

Common Reflection Point Processing

In CRP processing, in effect NMO corrections are applied to records from many doublets and the corrected records of selected doublets are added together. This process increases the signal-to-noise ratio. But it suffers from the disadvantage that diffracted waves are not clustered at their points of origin. While this invention may be applied to records resulting from CRP processing, it is technically best to apply the invention, without CRP preprocessing, to the original field records themselves.

Aplanatic Processing

Certain processing which is useful in this invention, such as analog-to-digital conversion, may occur during field operations, either during the exercising of the source-receiver doublets or subsequently. But the main processing generally occurs in a data processing center.

In one way of practicing this invention, original seismic-wave records of the analog type are recorded in the field. In another way of practicing the invention, digital records which do not incorporate NMO corrections are recorded on magnetic tape directly in the field. In still other ways of practicing the invention, analog or digital records which have been subjected to NMO corrections or CRP preprocessing are further processed in accordance with this invention. In any event, such records are further processed in a data processing center to create a digital image of subterranean formations in the cells of a computer memory.

In the main processing, digitally reproducible seismic-wave analog records are converted into digital electrical signals and these signals, in digital form, are stored in and algebraically summed in cells of a computer memory unit that corresponds respectively to the points in the earth from which the waves could have been deflected. As a result of this processing, in accordance with this invention, a latent image of the structure of the earth is formed in the computer memory unit. In this image the values that some earth formation characteristics have at various points are represented by digital numbers in corresponding cells of a computer memory. We call this image a digital image.

In accordance with this invention, this digital image may be reproduced in any one of many ways in order to produce a visual display, or picture, of the subsurface structure. For example, the visual display may be in the form of a vertical profile, a horizontal section, or a curvilinear or tilted section. In some cases it may even be in the form of a rendition in three dimensions in which various features of the subsurface structure are represented by semi-transparent objects.

In accordance with this invention, the final display provides a more accurate representation of subsurface structure than has been obtainable heretofore. More particularly, the actual locations of reflectors and diffractors in the earth are more accurately depicted in the final display.

Initially we will consider the application of the invention to records of the type produced in the course of field operations of the type represented in FIGS. 1, 3, and 5 and 7 and to which normal moveout corrections have not been applied. Such a record RO is represented in the lower part of FIG. 9. For simplicity of initial explanation it will be assumed that the velocity of seismic waves is constant throughout the region under investigation.

Figure 12:
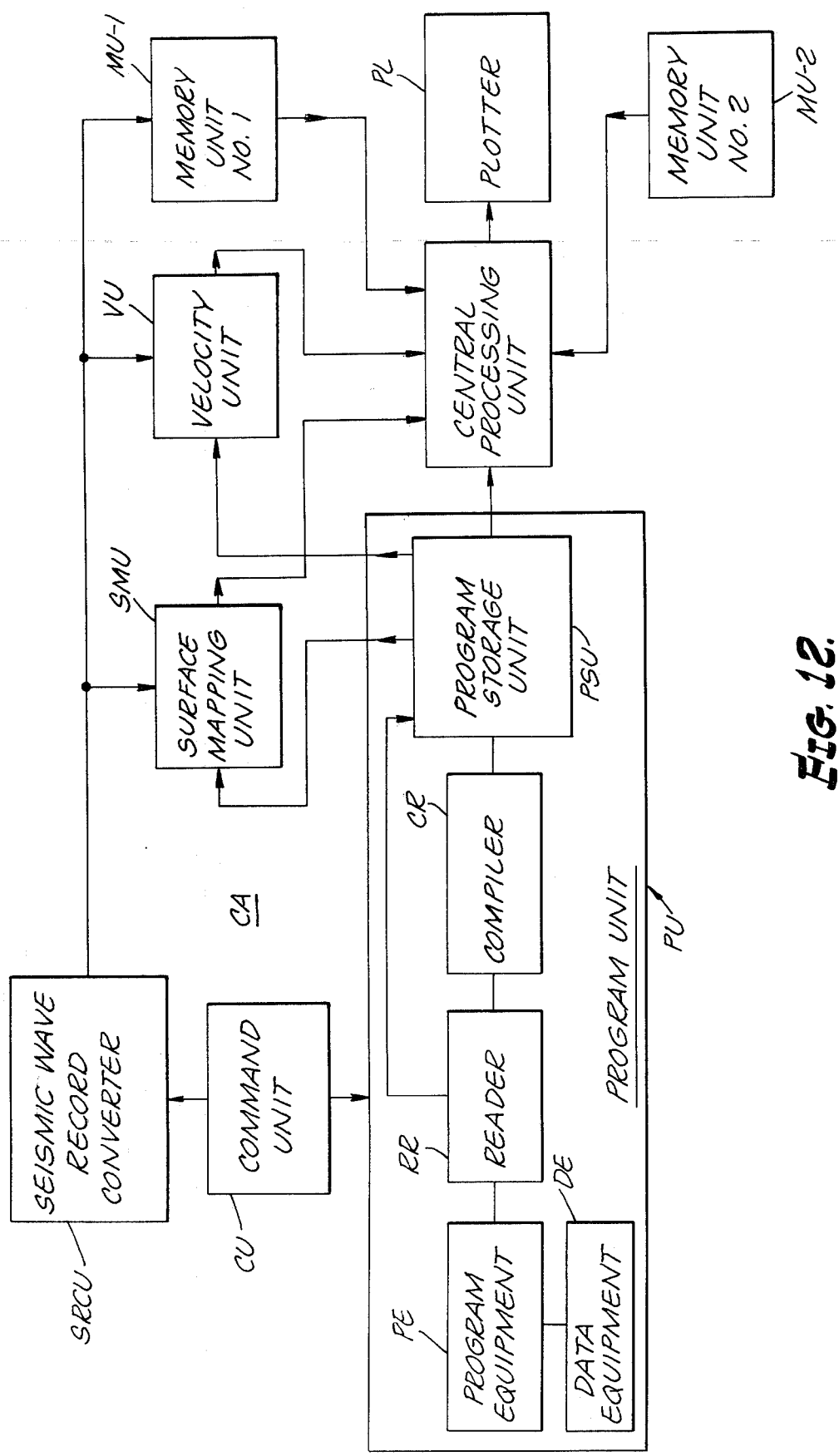
FIG. 12 is a block diagram illustrating a computer programmed in accordance with this invention.

The invention may be practiced by means of computer apparatus, including a general purpose computer, illustrated in FIG. 12. This apparatus includes a program unit PU, a command unit CU, a program storage unit PSU, a computer memory, including first and second main memory units MU1 and MU2, a central processing unit CPU, a seismic-wave record converter unit SRCU and a plotter PL. The program unit PU includes programming equipment PE such as a deck of punched cards, a punched tape, or a magnetic tape which carries the program instructions, written in machine-readable form in some conventional high-level language such as FORTRAN or in machine language. This programming equipment is supplied to a reader RR which reads these instructions and feeds them to a compiler CR which converts the instructions into electrical signals, which establish the states of various magnetic cores within a program storage unit PSU for directing the performance of the various operations required, in response to starting and other signals from the command unit CU. The command unit CU, which may be in the form of a console bearing various command switches, is employed for initiating and terminating the operations desired.

The program is accompanied by data equipment, such as punched cards, which initially stores surface mapping information in the surface mapping unit SMU and velocity information in a velocity unit VU. The data equipment cards bear arrangements of holes which represent basic data, such as data respecting locations of seismic wave generating stations S and geophone stations G together with their identifying index numbers s and n; and data representing travel times from any reference point on the surface of any points beneath the earth that bear a predetermined differential positional relation to such surface point and differential index numbers of those subsurface points relative to the reference surface point. Information correlating the index numbers of the records with the index numbers s and n of the sources and receivers are also stored.

In this connection it should be borne in mind that at the time that the selections are made for the locations of the seismic wave generating stations S and the seismic wave receiving stations R, data representing the location of the various points at the surface of the earth are recorded. Alternatively, the location data may be partly in the form of coordinates recorded directly on the tape at the time seismic waves are generated. Such coordinates are conventionally obtained with electronic surveying equipment. In any event, these data are transferred to punched cards or punched tapes or some other machine-readable equipment and this equipment is then incorporated in the data equipment DE and transferred by suitable means to a surface mapping unit SMU where such data are stored for later use in the analysis of the seismic wave recordings.

When a seismic wave record is supplied to the seismic wave record converter SRCU the index number on the record is read, thereby triggering the operation of the surface mapping unit in order to establish appropriate reference points in the memory unit MU1 so that the data from each of the source-receiver doublets will be stored in their proper relative positions within the computer relative to the locations of the doublets at the surface of the earth.

The stored program includes means for processing in sequence the recordings corresponding to the respective doublets. In one method of practicing the invention, a table of subsurface points that are isochronic with respect to a doublet of zero length is stored with respect to each travel time, together with a list of corrections that depend on travel time, velocity, and doublet length. With this arrangement the location of all subsurface points that are isochronic with respect to any doublet of any length and for any travel time are available for use with the program.

Having stored the program and the geometry data, the computer apparatus CA is ready for processing of a series of original analog records. These records are fed one at a time to the seismic wave record converter unit SRCU. Initially, before any records are processed, a "zero" is stored in each of the cells of the second memory unit MU2. In other words, prior values are erased and replaced by zeros in binary digital form.

For simplicity of explanation it will be assumed that the record being processed is one in which the train of waves received by each receiver is stored on magnetic tape in binary digital form.

When the seismic wave record is to be processed, it is placed in the seismic wave record converter unit SRCU. Then, in response to a signal from the command unit CU, each trace of the record is moved past a bank of reading heads to convert the binary signals on the magnetic record into a series of binary digital electrical signals. Binary digital signals representing these data and binary signals representing how the amplitude of the received wave varies along the length of each trace are both supplied initially to the first memory unit MU1. When the data from the seismic wave recording RO have been stored in the memory unit MU1, an "end of record" marker on the record initiates the operation of the apparatus to store the data isochronically in the second memory unit MU2.

In operation, the various signals stored in the first memory unit MU1 corresponding to each trace are processed in the central processing unit with the aid of the program in the program storage unit PSU, the mapping unit SMU and the velocity unit VU. As a result of this process, each of the amplitude signals appearing on the trace is converted into a corresponding binary digital electrical signal and this digital signal is supplied to each of the isochronic cells where it is added to the digital signal already stored there.

Stated differently, appropriate operations are performed in the central processing unit CPU in accordance with specifications, or instructions, in the program to store a binary manifestation of each digital electrical signal developed from the record for each doublet in the cells of the second memory unit MU2 that are isochronic with respect to the doublet. In determining which cells to use for isochronic storage, account is taken of the location and length of the doublet and the travel time corresponding to the electrical signal. In the simplest way of performing these operations, the computer program includes means whereby information previously stored in the velocity unit VU and position data stored in the surface mapping unit SMU are used for selecting the cells in which to store data corresponding to any particular doublet and wave travel time.

As mentioned, a table is stored in the surface mapping unit to relate the index numbers of the sources and receivers to their positions at the surface of the earth. The program unit includes a subprogram which sequentially identifies cells in the second memory unit MU2 which are isochronic with respect to any travel time for any doublet formed by any specific source and any specific receiver. This subprogram responds to the index and other data at the head of each record and to the travel time for each digital signal corresponding to successive positions along the length of the record to identify the corresponding isochronic cells and to algebraically add a replica of that digital signal to those already stored in the respective isochronic cells.

Figure 13:
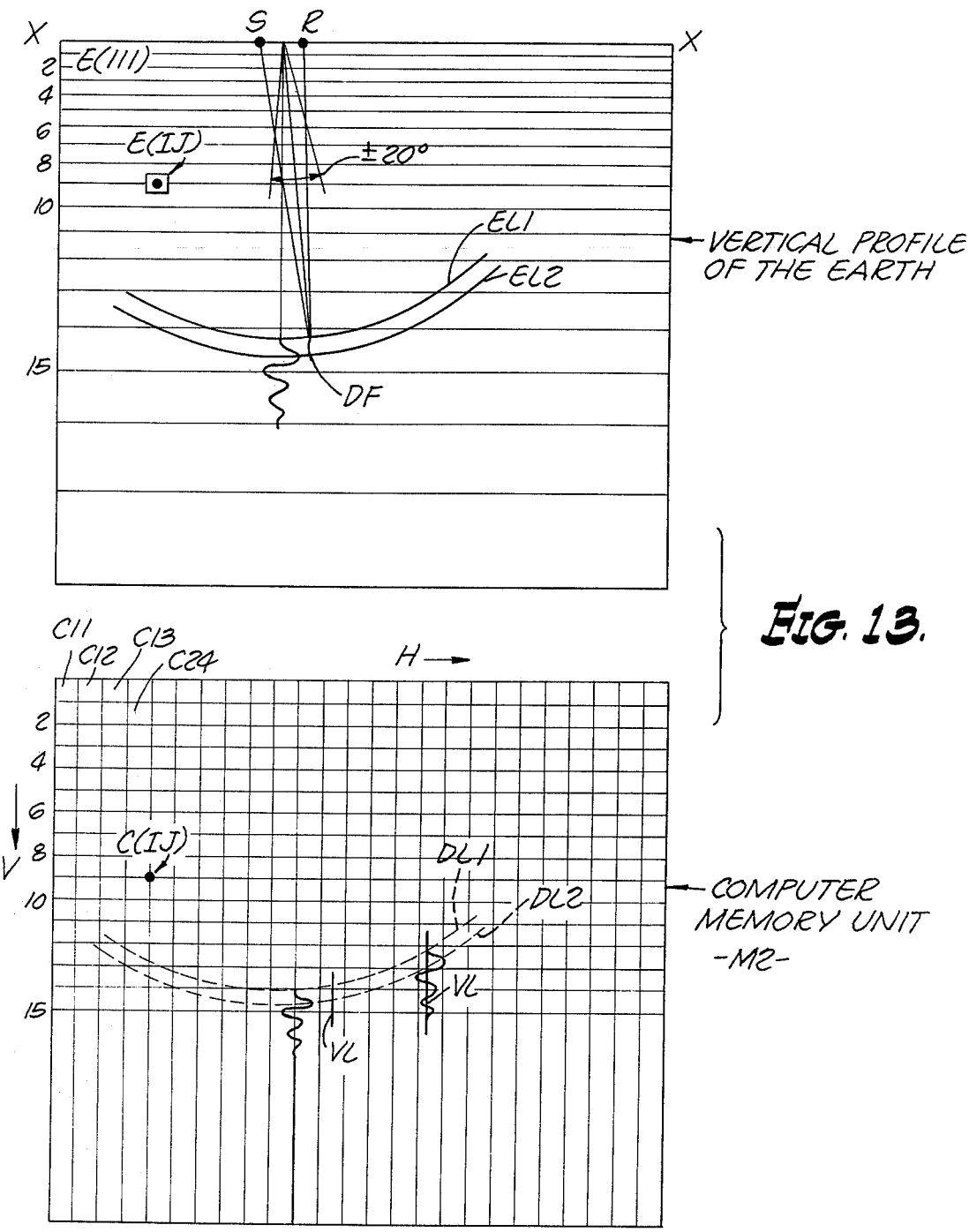
FIG. 13 is a diagram employed to explain how waves are stored aplanatically in the memory cells of a computer.

More particularly, if we are only concerned with a vertical profile, the memory cells of the second memory unit MU2 are identified by two—coordinate Cartesian numbers C(I,J), where I is an index number in one direction H and J is an index number in another direction V as indicated in FIG. 13. Equal changes in index I represent equal horizontal distances on the ground and in the earth while equal changes in index J represent equal intervals of vertical travel time. By vertical travel time is meant the travel time corresponding to a zero length doublet. The term vertical is used because in normal practice the wave would be located at a position in the earth at which the reflector would be located on the assumption that the waves actually traveled to the reflector over a vertical path.

The vertical travel time that is employed to determine the depth of any point C of FIG. 10 is actually one half of the vertical travel time that would be required for the seismic waves to travel along a vertical path to the reflector F, if it were at point C and from the reflector to the receiver.

Such an arrangement of memory cells is rectangular in nature, each cell corresponding to the intersection of two lines having coordinates I and J respectively in directions H and V. But the memory cells need not be physically arranged in a rectangular fashion. It is only necessary that they be assigned pairs of index numbers which correspond to such a rectangular arrangement. Each of these cells then corresponds to a segment E(I,J) of a profile of the earth along the line of exploration X—X as indicated in FIG. 13. It is now apparent that if seismic waves are received at the receiver R of an SR doublet at the surface of the earth as shown in FIG. 13, and a digital signal is generated that is representative of the amplitude of a seismic wave received at a time t from a deflector DF, since the direction to the deflector is unknown, it could be located at any point on the ellipse EL having focal points S and R. According to this invention, a binary digital signal proportional to that digital signal is added into each of a set of isochronic memory cells corresponding to points on that ellipse as indicated by the dotted line DL1 in FIG. 13. Another digital signal corresponding to some longer travel time would be stored in a second set of isochronic cells corresponding to another ellipse DL2. And so on.

The foregoing process is then repeated over and over for records made with respect to various doublets on each record so that ultimately there is stored in each memory cell of the memory unit MU2 an accumulated digital signal that is related to and representative of the reflection or other deflection characteristics of corresponding parts of the earth. As a result, a digital image of the subsurface structure is stored in the memory unit MU2.

In practice, as previously mentioned, it is not necessary to store the data in cells corresponding precisely to elliptical curves since, as is well known, an ellipse may be approximated by a circle over a limited part thereof.

In some cases, in the interest of economy and clarity, such data are stored only in cells corresponding to a relatively small angle of about $\pm 20°$ centered in the appropriate general direction of the subterranean structure of interest. Thus, if the subterranean formations have only slight dips, such as about 5°, the signals may be stored in cells that lie within an angle of $\pm 20°$ from the 5° direction. When limiting the storage in such a manner, the magnitude of the stored signals is tapered or reduced toward the outer edges of the angular range of interest to avoid effects that abrupt changes might otherwise produce. This is done by assigning an attenuation or multiplying factor to each isochronic cell according to the angular departure of the cell from the vertical and, by means of a suitable program segment in the programming equipment, multiplying the digital signal by this factor to produce a digital signal representative of the product and storing this product signal in the required cell.

In some cases it is desirable to "aim" the tapering function in an average direction toward the strata so that the average direction is more or less perpendicular to the strata. If the angle of this average direction from the vertical is $\phi_o$, as indicated in the upper portion of FIG. 13, then the tapering function becomes $F(\phi-\phi_o)$.

It can be shown that the cumulative amplitude of the digital signals stored in any cell corresponding to a deflecting point P can be represented by the equation:

$$A_p = \Sigma \frac{F(\phi - \phi_o)}{2\pi v^2 \sqrt{t_{sp}t_{pn}}} \frac{L^2}{GH} A[s, n, t - t_{sn}]$$

where

A = the recorded wave train.
s = an index number of the source location S.
n = an index number of the receiver location R.
$t_{sp}$ = time of travel of a part of a wave from the source S to the deflecting point P.
$t_{pn}$ = time of travel from the deflecting point P to the receiving point n.
t = the time elapsed since the inception of the seismic wave signal generated at the source.

$$t_{sn} = t_{sp} + t_{pn}$$

v = the average velocity with which waves travel from the source S to the deflecting point P and thence to the receiving point R.
$\phi$ = the angle toward the position of a point from which the wave might have been deflected.
$\phi_o$ = the angle for minimum, or zero, taper.

$F(\phi)$ = a function of $\phi$ to take tapering and other directional factors into account.
G = the relative gain or amplification of waves arriving at time t compared with the gain or amplification of the system at some arbitrary reference time.
$L^2$ = a numerical constant having the dimension of an area.
H = a correction factor introduced to avoid wide (more than about 5-fold) changes in average amplitude over large (10% or more) sections of the recording.

The tapering function F has a maximum value where $\phi = \phi_o$ and zero values where $\phi - \phi_o = \pm 20°$ or more.

It is to be noted that the angle $\phi$ is measured relative to the center of the doublet, not at the source or receiver. As explained above, during the recording, the gain of the recording system is controlled in such a manner as to compensate for the gradual diminution of the strength or amplitude of the waves during the period of recording. In other words, to a first approximation the gain compensates for the change in distance as well as for other attenuation factors. Accordingly, to a first approximation, when considering the seismic waves that have traveled by different paths or over a considerable distance the formula reduces to:

$$A_p = \Sigma F(\phi - \phi_o) B[s, n, t - t_{sn}]$$

where $F(\phi - \phi_o)$ is the tapering function and $$B = (dA)/(dt)$$

The summation of the waves is taken over all the traces of all the seismic wave recordings that have been processed. It is well known that, where the velocity v of the earth is constant over the volume of space through which the waves travel, the travel time t from the source to the receiver is the same for all points that lie on an ellipsoid that has its foci at the source S and at the receiver R. The ellipsoid lies on a major axis equal to vt. Accordingly, in a vertical plane, the point P from which the received wave has been deflected lies somewhere on an ellipse L as indicated in FIG. 10 and an ellipse EL1 as indicated in FIG. 13.

After a series of seismic wave records have been processed in this manner, then upon suitable operation of the command unit CU the information stored in the memory of the computer is processed in such a manner as to produce in the plotter PL a vertical profile or other desired display assuming the deflectors lie in a vertical plane.

If the record being processed are in the form of an analog record, which represents how the amplitude of the recorded signal varies as a function of travel time, these recorded signals are converted into a sequence of binary digital signals in an analog-to-digital converter unit that forms part of the seismic record converter unit SRCU. Each of such digital signals consists of a stream or other sequence of positive pulses and negative pulses, which represent 1's and 0's respectively, located in preassigned bit positions on a record or in a time-variable signal, as is well known in the art. In practice, the 1's and 0's are often represented by magnetization in opposite directions on a magnetic tape. Each of the signals also includes a 1 or a 0 in a leading or other preassigned bit position to represent the sign (+ or −) of the signal. Each of said sequences also includes a framing bit or some other signal indicating the beginning of the series of pulses in each binary signal, all as is well known in the art.

If the seismic wave recording has been made in the field in the form of binary digital signals as in the form of binary digits on magnetic tape, the analog-to-digital converter is omitted. In this case, the tape is moved past a set of reading heads which detect the magnetic bit pattern thereby generating the required sequence of electrical pulses.

If the records were made in the form of variable density film or the like, then the seismic record data converter SRCU includes a suitable optical transducer for producing a sequence of analog signals corresponding respectively to deviations of the transparency of the film from the average transparency according to practices that are well known. Such average is taken over a time interval, such as 0.20 sec, long compared with the periods 0.04 to 0.01 sec of the waves being reproduced. The resultant analog signals are then processed in the analog-to-digital converter stage of the record converter SRCU.

In the best embodiment of the invention, cells of a memory unit are assigned index numbers that cause the respective cells to correspond respectively to various portions of the earth throughout a volume (that is, in three dimensions) beneath the surface of exploration. In such a case, digital signals from various doublets at the surface of earth above that volume are added into cells that represent points on the surface of an ellipsoidal or other isochronic surface. This system is particularly useful when the recordings have been made along closely spaced lines of exploration, as in FIG. 3, or over a rectangular array of doublets as indicated by FIG. 4. In this case, digital signals are accumulated algebraically in various memory cells in accordance with data collected over the surface area. As a result, a three-dimensional digital image of the subsurface structure is formed in the subsurface memory unit.

FIGS. 14 and 15 illustrate certain effects of isochronically storing in a computer signals that represent digital signals obtained from various traces of a series of seismic wave traces. In these examples, the source remains fixed in position and the source-receiver doublet is exercised by the use of a large number of receivers 1, . . . 24 located at uniformly spaced points on one side of the source S. FIG. 14 illustrates certain effects obtained by accumulating certain waves detected at receivers 1, 4, 7, 10, and 13. And FIG. 15 illustrates effects obtained by storing certain waves recorded by receivers 16, 18, 20, 22, and 24.

In FIG. 14 the wave recorded at each of the five doublets involved is reproduced by storing a particular part of the wave, say a peak of the wave, in cells that correspond to points in the earth on a corresponding isochronic line. These peaks tend to accumulate and reinforce each other along a series of computer memory cells corresponding to a surface ED representing a reflecting horizon. Elsewhere they tend to cancel each other. As a result, the accumulated data stored in the computer represents a digital image of the reflecting surface. FIG. 15 shows how data stored in cells on five isochronic lines corresponding to source S and receivers 16, 18, 20, 22, and 24 produce an accumulation in the nature of a cluster at a diffracting point D at an end of the surface ED that has been displaced by a fault F.

In the case of FIG. 14, the effect of accumulation of the data in the memory cells of the computer renders the attitude and location of the reflecting surface FD more apparent than would be the case if a string of supposed reflectors were merely located beneath midpoints of the various doublets S-R1, S-R4, S-R7. In FIG. 15, an effect due to diffraction becomes apparent. Such an effect could not be achieved without this invention. Thus, the accumulation of data from various waves in the various cells throughout the memory unit of the computer produces a more natural and accurate image of the subsurface structure than could be achieved by ordinary methods, including those utilizing ordinary normal moveout corrections.

FIG. 16 illustrates a more complete profile obtained by the aplanatic mapping of records of waves that have been recorded with respect to the doublets S-R1, S-R13, . . . S-R24. The ellipses there plotted with respect to the various doublets include those represented in FIGS. 14 and 15 as well as additional ellipses. Assuming that these ellipses represent parts of very strong or dominant waves, the location of the fault F is rendered fairly apparent and even the relative displacement of the strata on opposite sides of the fault become apparent. Furthermore, because diffracted waves tend to cluster at the edges of beds, the demarcation of the fault becomes clearer than otherwise would be the case.

In FIGS. 14, 15, and 16 the data have been displayed as if only a vertical profile were of interest. But if the distribution in all directions beneath the surface were of interest, similar striking effects would be achieved.

In any event, once the digital image of the earth has been formed in the computer memory, whether the image represents a vertical profile or a three-dimensional distribution of subsurface characteristics, the computer is operated by an appropriate "plot" command generated in the command unit CU to operate a plotter PL to reproduce the image of the profile in a vertical plane or an image in any other selected surface that intersects the three-dimensional image to produce a visual display which can then be readily interpreted by a geologist or other user.

To this end, a segment of the program equipment is employed to select those cells in the computer memory from which digital signals are to be read out (nondestructively) to operate the plotter so as to produce on a recording medium a visible signal corresponding to the respective summed signals. Those marks may be in the form of areas on photographic paper exposed to have reflection coefficients proportional to the respective digital signals so as to produce, in effect, a picture of the earth as viewed in the selected surface. By way of example, the plotter may be programmed to produce high-reflection-coefficient (or white) areas for large positive digital signals and low-reflection-coefficient or black areas for large negative signals and intermediate-reflection-coefficients for intermediate digital signals, there being a one-to-one correspondence between digital signal strength and the resultant reflection coefficient on the photographic paper throughout the possible range of values of the binary signals and the reflection coefficient varying monotonically with signal strength.

In the resultant visual display, positions of reflectors relative to surface locations are more accurately indicated than they would be if the records were only subjected to processing in a normal moveout corrector. Furthermore, areas or volumes or lines or points of diffraction become more clearly indicated than heretofore because of their tendency to cluster. In effect, where waves that have been reflected are accumulated in the memory unit, the accumulated signals have a particular amplification. But where the recorded waves have been diffracted from a line source or point, they are accumulated with greater amplification. This increase in amplification helps to compensate for the fact that the diffracted waves are usually inherently weaker than reflected waves. As a result of this invention, therefore, visual displays of subsurface formations are produced which indicate the locations of subsurface structures more accurately than heretofore, whether the subsurface deflectors are in the form of reflectors or in the form of diffractors.

In practice, account is taken of the fact that the velocity of travel of seismic waves varies as a function of depth. Typically, for example, the velocity of a vertically traveling seismic wave increases about 600 feet per second when the depth is changed by 1,000 feet. By storing digital signals from various source-receiver doublets in cells that correspond to points along corresponding isochronic surfaces, the signals are integrated (added algebraically) to achieve a latent visual result corresponding to that which would be achieved if a wave C were plotted not directly beneath the midpoint of a source-receiver doublet SR in the position of the reflector P in FIG. 10 but in its correct position in space.

As mentioned above, it is not necessary that the digital signals be stored at points corresponding to an ellipse but merely that they be stored at points along a curve that approximates an ellipse. Such a curve may be circular or parabolic or hyperbolic or otherwise shaped to approximate an ellipse. The degree of approximation required depends somewhat upon the depth from which the waves have arrived at the surface and the length of the doublet. The more closely the curve approximates an ellipse, the more accurate the results, especially where the waves have been deflected by a diffractor.

It is well known that if seismic waves had their origin in an explosive or other impulse source, the minimum wavelet consists of at least three half pulses, as indicated by the wave train WA of FIG. 17. In effect, after such a wavelet has traveled downwardly and has been reflected at various transition zones beneath the surface of the earth, successions of a very large number of such wavelets of different amplitude travel to the receiver over different paths thereby forming the train of seismic waves. The wave train represented in the expression $A(s,n,t-t_{sn})$ set forth above is a summation of a very large number of such wavelets. It is to be noted that the derivatives of such wave trains appear on the righthand side of the equation involved in forming the digital image. The derivative would be an accumulation of a large number of wavelets, each of which represents a derivative of the wavelet WA. Such a derivative wavelet is represented by the symbol WB in FIG. 17. Differentiations of this type occur in various parts of the electrical circuitry, in the field recording equipment and in the seismic wave record converter. Usually it makes little difference whether we accumulate wavelets of the form WA or wavelets of the form WB or wavelets related in some other way to the elementary wavelet WA. The end result is still the same: a digital image of subterranean formations is produced.

In the application of the invention described above, it has been assumed that each part $p_1$, $p_2$, $p_3$, $p_4$, $p_6$ of FIG. 17 is treated in the same manner, in that a signal proportional to the amplitude of each of these parts (but tapered in accordance with the general direction $\phi_o$ to the reflecting horizons) is stored in all the cells of the computer that are isochronic with the doublet used to produce the record of the wave train. In practice, such precision is not necessary. It is sufficient if the cells that are isochronic with a selected point, such as the peak $p_3$ of the wavelet, be identified and accurately selected, and if the signals corresponding to each of the other parts, $p_1$, $p_2$, $p_4$, $p_6$, etc. of the wavelet be stored in an appropriate "vertical" series of cells. For convenience we call this vertical storage. This corresponds, in effect, to a situation represented in FIG. 13 in which the wavelet WA is stored in a vertical series of cells with peak $p_3$ at a midpoint beneath the doublet with the peak $p_3$ on an ellipse DL isochronic with respect to the doublet SR and then the wavelet is stored repeatedly on different vertical lines of cells on opposite sides thereof with the peak $p_3$ stored in cells corresponding to points that lie on the ellipse DL throughout the angular region $\pm 20°$. In carrying out such a process preferably the waves are stretched an increasing amount as $\phi$ is increased in accordance with methods well known in the application of normal moveout corrections.

When applying the methods to the storage in memory elements three-dimensionally, advantage is taken of the fact that the aplanatic surface may be approximated by a surface of revolution about the axis of the doublet. In the simplest way to do this, the computer is programmed to store the wave WA, not just in the vertical line of cells in the plane represented in FIG. 13 but also in other cells above and below that plane that bear an isochronic relation to the signal being stored. Thus, where signals are being stored in vertical lines VL, as described above in relation to the isochronic memory elements DL1, they are also stored in additional sets of cells that correspond isochronically to elements of the earth that lie in a plane perpendicular to the line of exploration.

In order to render this invention more effective it is desirable to utilize data in which the ellipses that correspond to various doublets and to reflected waves and diffracted waves lie within about one-quarter of a wavelength of each other on the vertical profile. This may be accomplished, for example, by locating the midpoints of successive doublets within a very short distance horizontally on the surface of the earth. Such a short distance may be about 25 to 50 feet. Alternatively, use may be made of common reflection point (CRP) surveying methods, such as those illustrated in Mayne U.S. Pat. No. 2,732,906.

In the practice of the invention utilizing the system involving multiplexing, the multiplexed signals on each record corresponding to a single shot are usually demultiplexed before being processed aplanatically in the manner heretofore described. While demultiplexing is generally performed by means of the same central processing unit CPU, for convenience it is described briefly herein in connection with FIG. 18. In this system, a multiplexed record MR of the type produced in a system described above in connection with FIGS. 10 and 11 is processed in a demultiplexer DMXR in such a way as to produce another record DMR in which the signals recorded on the multiplexed record MR are sorted. In this sorting process, all of the signals corresponding to each of the respective hydrophones $R_1 \ldots R_{24}$ are arranged together on a separate section of the tape along the length thereof. In other words, all of the signals that were previously recorded with respect to the hydrophone $R_1$ on the multiplex record MR are arranged in a time-sequenced relation on one section of the demultiplexed record DMR. Then similarly all of the signals previously recorded on the multiplexed record MR with respect to the hydrophone $R_2$ are stored in time-sequenced relation on the next section of the demultiplexed record, and so on. The entire set of data from a particular shot corresponding to a particular index is then supplied to the seismic wave record converter SRCU and processed aplanatically in the manner described above.

In an alternative method of practicing the invention, records corresponding to common reflection points may be processed in order to produce a combined record of waves that, theoretically, might have been received at a zero-length doublet at the common midpoint of all of the SR doublets for which waves have been received from common reflection points. In this case, the CRP records are then processed aplanatically, treating each of the CRP records as if it were a record of waves received at such a zero-length doublet. But this method is not as effective as one in which the records produced by the individual records are processed aplanatically and the algebraic summation is carried out in the memory cells of the computer.

By employing a system in which the average number of records made over a distance of about 1000 feet is substantial, that is, 20 or more, good integrating effects can be achieved. Once such an image is stored in a computer the image or any part thereof may be transferred to a plotter PL by means well known in the art of computer graphics.

At the time of transfer to the plotter, account may be taken of how velocity varies with depth or otherwise, so that the final display shows the correct spacial relations between different reflectors.

It will be understood that in the practice of this invention when applied to a general purpose computer the various programming and data storage steps and also the various steps performed in making the required calculations involve manipulation of the physical states of the various switching or memory elements in the computer. By way of example, if the computer consists of switching elements in the form of magnetic elements, the direction of polarization of the magnetic fields in the magnetic elements are manipulated to represent 1's and 0's which taken in groups represent instructions of the program or replicas of the data as the case may be. Though magnetic cores may be employed as memory elements, the computer memory may consist wholly or partly in magnetic discs, magnetic drums, or magnetic tapes that have areas assigned to represent the various memory elements all in accordance with methods well known in the art. While the invention is normally practiced with reference to a binary base, it will be understood that the invention may also be employed with computers operating on a ternary, decimal or other base. Furthermore, while the switching and memory elements may be in the form of magnetic elements whether they be represented in core, on disc, on drum, or on tape, these elements may be in other forms such as diodes or transistors that are capable of changing state to represent data and computer instructions.

As used herein the term memory cell usually consists of a series of cores or other memory elements sufficiently large in number to store any or all of the alphanumeric characters required to represent the data and the program. For example, each memory cell may consist of 24 such cores thus permitting the storage of a 24-bit number therein and 8 such cores permitting the storage of a 8-bit character therein. An additional core is customarily included in each memory cell to use for storing a parity bit.

It is thus seen that this invention makes it possible to produce images of subsurface structures of the earth in an entirely new way and that such images may more accurately represent the relative positions of irregularities in that structure than has been possible heretofore. These results are made possible in accordance with this invention by algebraic accumulation of replicas of seismic wave trains received by an exercised doublet over the area under investigation and then the reproduction of the aplanatic image formed in the memory element of the computer in visual form on a suitable display medium.

The invention claimed is:

1. In a method of mapping the subsurface structures in a portion of the earth by processing seismic records with a general purpose digital computer having a control unit and having a memory unit comprising multistate memory cells in said control section and in said memory section, and utilizing a set of two-member doublets each of which is composed of a source and a receiver, at least one member of each doublet being different from either member of every other doublet, wherein seismic waves that are generated by the source of a doublet are received by the receiver of the doublet after the waves have traveled downwardly into the earth and have been deflected upwardly from various parts of the subsurface formations, and the doublet set has been exercised by exchanging either the source or the receiver or both from each doublet with those of another doublet, whereby with respect to each doublet a train of seismic waves is received as a function of time, and wherein position data are provided respecting the locations in the earth at which the members of the doublets were located during the generation and reception of the corresponding trains of seismic waves, the improvement comprising:

(a) the step of changing the states of some cells of the computer to establish a one-to-one correspondence between respective memory cells of the memory unit with various parts of the earth that includes formations from which such waves may have been deflected;

(b) developing electrical signals representing the position data of the sources and receivers;

(c) changing the states of some cells of the memory unit of the computer in accordance with said position data signals;

(d) the step of creating a series of digital electrical signals representative of the amplitude and sign of respective successive portions of the seismic wave train recorded with respect to such a doublet;

(e) the step of selecting sets of said cells in the memory unit, each of which memory cell sets respectively corresponds isochronically with the times of transmission of respective parts of the seismic waves from the source of said last mentioned doublet to such deflecting parts of the formation and thence to the receiver of such doublet, which parts occur at successive times in the received seismic wave train, taking into account the position data of the members of each of said doublets as well as the times of transmission of said parts of the seismic waves; and (f) the step of establishing the states of cells in the control section of the computer to program the control to perform said steps (d) and (e) with respect to each of a series of such doublets to supply a digital replica of each such digital electrical signal in each series to the respective set of memory cells isochronic with respect to the respective digital signals in the respective doublets, and (g) changing the states of the respective cells in the memory unit in accordance with the algebraic sums of the digital electrical signals supplied thereto, thereby aplanatically mapping said received waves in said memory unit to form a digital image of the structures from which such seismic waves have been received.

2. In a method of mapping subsurface structures of the earth as defined in claim 1 wherein the doublets are located in an areal array at the surface of the earth, and the computer is programmed to establish three-dimensional sets of isochronic cells corresponding to the respective travel times of the seismic waves.

3. In a method of seismic prospecting including mapping subsurface structures as defined in claim 1,
selecting a plurality of cells in said memory unit corresponding to parts of the earth lying adjacent a predetermined geometrical surface therein, and
plotting characteristics of said parts in accordance with the values of the digital electrical signals represented by the states of correponding cells of the memory unit.

4. In a method of mapping subsurface structures of the earth as defined in claim 1, the improvement comprising the steps of establishing the states of said memory cells in a zero-condition prior to supplying such digital replicas to said memory cells and modifying those states in accordance with said digital replicas to produce in such memory cells new states representative of the algebraic sums function of the digital replicas supplied thereto.

5. In a method of mapping subsurface structures of the earth as defined in claim 1 which comprises:
the step of selecting the series of digital signals referred to in step (b) of claim 1 to correspond to a sequence of portions of such seismic wave train; and
the step of supplying replicas of said plurality of selected digital signals to a series of memory elements that correspond respectively to a plurality of series of points that are located along predetermined lines in the earth.

6. In a method of mapping the subsurface structures of the earth as defined in claim 5 wherein said predetermined lines are substantially vertical.

7. In a method of seismic prospecting including mapping subsurface sructures as defined in claim 1, and
reproducing said digital image in visible form.

8. In a method of seismic prospecting including mapping subsurface structures as defined in claim 1,
selecting a plurality of cells in said memory unit corresponding to a predetermined part of the earth in the area of exploration; and
converting the states of said cells into visible representations of the states thereof whereby characteristics of said part of the earth may be visualized.

9. In a method of mapping the subsurface structures in a portion of the earth in a general-purpose computer having memory cells as defined in claim 1,
carrying out step (g) without first simultaneously storing separate intermediate images of successive wavefronts of the respective generated seismic waves.

10. In a system for analyzing within a general purpose digital computer having a control unit and a memory unit, records of a plurality of trains of seismic waves, wherein the respective seismic-wavetrain records have been formed by exercising a source-receiver doublet over a limited area of the surface of the earth, each seismic wave train comprising a series of alternating waves of varying amplitude that have been received at the receiver of said doublet after a seismic wave has been generated at the source of said doublet and has been transmitted downwardly into the earth and has been partially deflected in the earth during the downward travel, the amplitude of the wave in each seismic-wave-train-record varying along the length of the record in a manner corresponding to that in which the amplitude of the received wave varies as a function of time: the combination of means for setting the states of position data cells in said computer system in accordance with position data respecting said sources and receiver;

means in said control means and responsive to the states of said position data cells for selecting within said general-purpose digital computer a plurality of memory cells in said memory unit corresponding respectively with a plurality of points geometrically distributed in a known manner throughout a volume of the earth below said limited area; and means in said system for aplanatically integrating the respective records, said means comprising (a) conversion means for converting signals on each of said records into a corresponding series of sequentially occurring digital electrical signals having relative magnitudes that vary in a manner corresponding to the manner in which the amplitude of the recorded seismic wave train varied as a function of time, some of said electrical signals having positive values and some of said electrical signals having negative values, (b) transfer means for supplying a replica of each said digital signal and controlled in part by the states of said position data cells to each of a plurality of memory cells in said computer which correspond respectively to points in the earth that bear a substantially isochronic relationship with respect to the respective source-receiver doublet which received the seismic wave train to which said each digital signal corresponds to set the states of said memory cells in accordance with the algebraic accumulation of said replicas in the respective memory cells, whereby the cumulative manifestations of said replicas are distributed among the memory cells in a manner such that the states of said cells simulate the characteristics of the structure of the aforesaid volume of the earth.

11. In apparatus as defined in claim 10, means responsive to the accumulated signals in various storage units for displaying in visual form an image representing the substructure of the earth beneath said limited area.

12. In a general-purpose computer programmed for mapping subsurface formation in a portion of the earth from a plurality of time-series of digital signals representative of seismic waves generated and received by a seismic wave source and a receiver of a respective doublet of a plurality of doublets after deflection by various parts of the formations as defined in claim 8, (a) said transfer means including means for forming in said memory unit a digital image of the formations from which such seismic waves have been deflected and without first simultaneously storing separate intermediate images of successive wavefronts of the respective received seismic waves.

13. In apparatus including a digital computer for analyzing records of a plurality of trains of seismic waves, wherein the respective seismic-wave-train records have been formed by exercising a source-receiver doublet over a synthetic aperture extending over a limited area of the surface of the earth, each seismic wave train comprising a series of alternating waves of varying length and amplitude that have been received at the receiver of said doublet after a seismic wave has been generated at the source of said doublet and has been transmitted downwardly into the earth and has been partially deflected in the earth during the downward travel of the generated waves into the earth, the amplitude of the wave in each seismic wave train record varying along the length of the record in a manner corresponding to the manner in which the amplitude of the received wave varies as a function of time: the combination of
    (a) means for selecting within said digital computer a plurality of subsurface image memory cells corresponding respectively with a plurality of points aligned in a predetermined manner below said limited area;
    (b) means for setting the states of position-data cells in said computer to represent the positions of the sources and the receivers of the doublets corresponding to said records;
    (c) means responsive to signals recorded on each such record to produce a series of sequentially occurring digital electrical signals having relative magnitudes that correspond respectively to the manner in which the amplitude of a segment of a seismic wave train varies as a function of time;
    (d) means responsive to said digital electrical signals and the states of position data cells corresponding to each said record, for supplying replicas of said electrical signals to a respective series of said subsurface image memory cells,
    (e) means for repeating steps (a), (b), (c) and (d) to supply said replicas to various sets of subsurface image memory cells corresponding with different pluralities of aligned points, all of said pluralities of aligned points being isochronically related to the respective doublet used in producing said each record, and
    (f) means for setting the states of said subsurface image memory cells in accordance with the algebraic sums of supplied replicas corresponding to different doublets in cells isochronically related to the respective doublets, whereby the cumulative manifestations of said replicas are distributed among the subsurface image memory cells in a manner simulating the characteristics of the structure of the aforesaid volume of the earth.

14. In apparatus for seismic prospecting as defined in claim 13,
    means for reproducing in visible form the cumulative manifestations stored in some of said memory cells for displaying characteristics of such structure.

15. In apparatus for seismic prospecting as defined in claim 13,
    means for selecting a plurality of subsurface image cells corresponding to a predetermined part of the earth in the area of exploration; and
    means for converting the states of said subsurface image cells into visible representations of said states whereby characteristics of said part of the earth may be visualized.

* * * * *